(12) United States Patent
Dangy-Caye

(10) Patent No.: US 11,832,177 B2
(45) Date of Patent: Nov. 28, 2023

(54) TRANSMISSION SYSTEM COMPRISING FIRST AND SECOND BRIDGE DEVICES

(71) Applicant: SAGEMCOM BROADBAND SAS, Rueil Malmaison (FR)

(72) Inventor: Nicolas Dangy-Caye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 1497 days.

(21) Appl. No.: 15/108,046

(22) PCT Filed: Dec. 18, 2014

(86) PCT No.: PCT/EP2014/078593
§ 371 (c)(1),
(2) Date: Jun. 24, 2016

(87) PCT Pub. No.: WO2015/097070
PCT Pub. Date: Jul. 2, 2015

(65) Prior Publication Data
US 2016/0323816 A1    Nov. 3, 2016

(30) Foreign Application Priority Data
Dec. 26, 2013    (FR) ...................................... 13/63616

(51) Int. Cl.
*H04W 52/02*    (2009.01)
*H04L 12/12*    (2006.01)
(Continued)

(52) U.S. Cl.
CPC ......... *H04W 52/0203* (2013.01); *H04L 12/12* (2013.01); *H04W 28/0221* (2013.01); *H04W 84/12* (2013.01); *Y02D 30/70* (2020.08)

(58) Field of Classification Search
CPC .............. H04L 12/12; H04W 28/0221; H04W 52/0203; H04W 84/12; Y02B 60/50; Y02D 70/00; Y02D 70/142
See application file for complete search history.

(56) References Cited

U.S. PATENT DOCUMENTS

| 7,764,981 | B2 * | 7/2010 | Kalofonos | ............ | H04W 76/27 |
| | | | | | 455/574 |
| 7,873,986 | B2 * | 1/2011 | Nishibayashi | ............ | G06F 3/14 |
| | | | | | 726/2 |

(Continued)

FOREIGN PATENT DOCUMENTS

| DE | 10 2010 003 248 | | 9/2011 | | |
| EP | 2852114 A1 | * | 3/2015 | ........... | H04L 47/125 |

OTHER PUBLICATIONS

International Search Report and Written Opinion of the ISA for PCT/EP2014/078593 dated Mar. 10, 2015, 13 pages.

(Continued)

*Primary Examiner* — Bailor C Hsu
(74) *Attorney, Agent, or Firm* — Nixon & Vanderhye, P.C.

(57) ABSTRACT

A first bridge device, connected by a first wired link to a supplying device, and a second bridge device, connected by a second wired link to a consuming device, are interconnected via a wireless communication network and are able to be configured in: a nominal operating mode; an energy saving mode; or a stop mode. The first bridge device switches into stop mode following detection of deactivation of the first wired link, and switches into energy saving mode following detection of disconnection from the network of the second bridge device or when the second bridge device goes into energy saving mode or following detection of a low volume of bidirectional traffic. The second bridge device switches into stop mode following detection of (Continued)

deactivation of the second wired link, and switches into energy saving mode following detection of the consuming device being put into hibernation or following detection of disconnection of the network or detection of a low volume of bidirectional traffic.

17 Claims, 11 Drawing Sheets

(51) Int. Cl.
*H04W 28/02* (2009.01)
*H04W 84/12* (2009.01)

(56) References Cited

U.S. PATENT DOCUMENTS

| | | | | |
|---|---|---|---|---|
| 7,899,076 | B2* | 3/2011 | Lai | H04L 12/2898 370/459 |
| 8,588,120 | B2* | 11/2013 | Lee | H04W 52/0274 370/311 |
| 8,611,268 | B1* | 12/2013 | Thandaveswaran | H04W 52/0206 370/311 |
| 8,665,748 | B2* | 3/2014 | Jenne | H04L 12/12 370/254 |
| 8,817,817 | B2* | 8/2014 | Koenen | H04L 12/10 370/468 |
| 8,837,308 | B2* | 9/2014 | Byun | H04L 12/12 370/252 |
| 8,964,611 | B2* | 2/2015 | Das | H04W 52/0229 370/311 |
| 9,531,761 | B2* | 12/2016 | Chen | H04L 65/1016 |
| 9,549,370 | B2* | 1/2017 | Adjakple | H04W 52/0212 |
| 10,051,688 | B1* | 8/2018 | Huang | H04L 61/58 |
| 2006/0075269 | A1* | 4/2006 | Liong | G06F 1/3209 713/300 |
| 2007/0041321 | A1* | 2/2007 | Sasaki | H04L 47/10 370/235 |
| 2009/0055666 | A1* | 2/2009 | Yee | G06F 1/266 713/320 |
| 2009/0080388 | A1 | 3/2009 | Rohfleisch et al. | |
| 2009/0193157 | A1* | 7/2009 | Chen | H04L 12/12 710/16 |
| 2010/0198427 | A1* | 8/2010 | Fogelstrum | H04W 4/48 701/1 |
| 2010/0226388 | A1* | 9/2010 | Shen | H04L 12/4625 370/463 |
| 2010/0329164 | A1* | 12/2010 | Li | H04W 52/0225 370/311 |
| 2011/0075598 | A1* | 3/2011 | Jalfon | H04W 52/0209 370/311 |
| 2011/0213992 | A1* | 9/2011 | Satsangi | G06F 1/3209 713/300 |
| 2011/0222522 | A1 | 9/2011 | Akil et al. | |
| 2012/0042189 | A1* | 2/2012 | Dangy-Caye | G06F 1/3209 713/324 |
| 2012/0147768 | A1* | 6/2012 | Johnsson | H04L 12/10 370/252 |
| 2013/0024706 | A1* | 1/2013 | Katar | G06F 1/3203 713/321 |
| 2013/0113710 | A1* | 5/2013 | Choi | H04W 52/0296 345/169 |
| 2013/0288686 | A1* | 10/2013 | Chou | H04N 21/2365 455/450 |
| 2014/0126908 | A1* | 5/2014 | Diab | H04L 12/12 398/58 |
| 2014/0187234 | A1* | 7/2014 | Chou | H04W 52/0206 455/422.1 |
| 2014/0334364 | A1* | 11/2014 | Liu | H04W 52/0206 370/311 |
| 2015/0124780 | A1* | 5/2015 | Ode | H04W 36/18 370/331 |

OTHER PUBLICATIONS

S. Ricciardi et al., "Evaluating Energy Savings in WoL-Enabled Networks of PCs", *Industrial Electronics*, May 28, 2013, pp. 1-6.

* cited by examiner

TRANSMISSION SYSTEM COMPRISING FIRST AND SECOND BRIDGE DEVICES

This application is the U.S. national phase of International Application No. PCT/EP2014/078593 filed 18 Dec. 2014 which designated the U.S. and claims priority to FR 13/63616 filed 26 Dec. 2013, the entire contents of each of which are hereby incorporated by reference.

BACKGROUND

The present invention relates to a system for transmitting data from a data-supplying device to a data-consuming device, the data-supplying device being connected to the data-consuming device via a first bridge device making a bridge between a first wired link and a wireless communication network and a second bridge device making a bridge between a second wired link and the wireless communication network. The invention relates more particularly to managing energy consumption in such a data transmission system.

In a data transmission system, using bridge devices between a wired link, e.g. of the Ethernet type, and a wireless link, e.g. of the Wi-Fi type, is known, so as to provide flexibility for installing the data transmission system. Using these bridge devices thus allows avoiding having to install a cable directly between a data-supplying device, e.g. a residential gateway, and a data-consuming device, e.g. an STB (Set-Top Box) decoding device of the data transmission system. Indeed, the infrastructure in which the data transmission system is installed does not always allow easily installing this cable between the data-supplying device and the data-consuming device. Using these bridge devices therefore dispenses with these difficulties in installation.

For example, the wireless link used is of the Wi-Fi type in an N×N (N>1) MIMO (Multiple Input Multiple Output) mode in the 5 GHz frequency band. Such a wireless link is particularly well suited to transporting video data, but this arrangement consumes a particularly large amount of energy, especially when it is thought that its purpose is to replace a simple, generally passive, cable. In the case of a data transmission system relying on interfaces of the Ethernet and Wi-Fi type, a consumption of around 3 to 3.5 W per bridge device can be observed, meaning 6 to 7 W for linking the data-supplying device and the data-consuming device.

Techniques for reducing consumption known as "One Channel Listening" or "Power Save Polling Mode" (PSPM) are known. These techniques are not applicable to the present case, since their application conditions are not met.

It is desirable to overcome these drawbacks of the prior art. It is in particular desirable to provide a solution that allows reducing the energy consumption in a data transmission system in which a data-supplying device is connected to a data-consuming device via a set of two such bridge devices, without compromising the implementation of data transmissions from the data-supplying device to the data-consuming device, meaning without any impact experienced by a user of the data transmission system.

BRIEF SUMMARY

The invention relates to a data transmission system comprising a first bridge device and a second bridge device aimed at being interconnected via a wireless communication network, the first bridge device being adapted for connecting a data-supplying device via a first wired link, the second bridge device being adapted for connecting a data-consuming device via a second wired link. The system is such that each bridge device is able to be configured in one of the following modes: a nominal operating mode; an energy saving mode in which, at least, interfaces with one said wired link and with the communication network are activated at reduced performance; and a stop mode in which, at least, the interface with the communication network is deactivated, and in which the interface with one said wired link is activated at reduced performance. In addition, the first bridge device is adapted for switching from the nominal operating mode to the stop mode following detection of deactivation of the first wired link; the first bridge device is adapted for switching from the nominal operating mode to the energy saving mode following detection that the second bridge device is disconnected from the wireless communication network or that the second bridge device has gone into energy saving mode or following detection of bidirectional traffic volume between said supplying device and said consuming device that is less than or equal to a predefined threshold; the second bridge device is adapted for switching from the nominal operating mode to the stop mode following detection of deactivation of the second wired link; and the second bridge device is adapted for switching from the nominal operating mode to the energy saving mode following detection that said consuming device has been put in hibernation or detection of disconnection of the wireless communication network or detection of bidirectional traffic volume between said supplying device and said consuming device that is less than or equal to a predefined threshold. Thus, thanks to these different modes of the bridge devices, and to the switching conditions, the energy consumption in a transmission system According to a particular embodiment, the first bridge device is adapted for switching from the stop mode to the nominal operating mode following detection of reactivation of the first wired link, the first bridge device is adapted for switching from the energy saving mode to the nominal operating mode following reception via the first wired link of a request for putting said consuming device in nominal operating mode or following detection of a volume of traffic between said supplying device and said consuming device that is greater than or equal to a predefined threshold, or following reconnection of the second bridge device to the wireless communication network, the second bridge device is adapted for switching from the stop mode to the nominal operating mode following detection of reactivation of the second wired link, and the second bridge device is adapted for switching from the energy saving mode to the nominal operating mode following reception via the wireless communication network of a request for putting said consuming device in nominal operation or following reception via the second wired link of a message indicating that said consuming device has come out of hibernation or following detection of a volume of traffic between said supplying device and said consuming device that is greater than or equal to a predefined threshold.

According to a particular embodiment, the request for putting said consuming device into nominal operation is a magic packet intended for said consuming device in accordance with the Wake on LAN protocol.

According to a particular embodiment, the second bridge device detects that said consumer device has been put in hibernation: by regularly sending a probe message to said consumer device in order to test whether said consuming device is put in hibernation; or by analysing exchanges between said supplying device and said consuming device in accordance with the UPnP Low Power Standard; or by receiving from said consuming device a message indicating that said consuming device is being put in hibernation.

According to a particular embodiment, detection of the volume of bidirectional traffic between said supplying device and said consuming device is done by comparing a filling of the queues of the concerned bridge device with predefined respective thresholds.

According to a particular embodiment, the first and second wired links are of the Ethernet type and the wireless communication network is of the Wi-Fi type.

According to a particular embodiment, the system comprises said supplying device and said consuming device, said supplying device is a residential gateway adapted for transmitting audiovisual data to said consuming device, and said consuming device is a decoding device adapted for decoding the audiovisual data received from the supplying device.

The invention also relates to a method implemented by a data transmission system comprising a first bridge device and a second bridge device interconnected via a wireless communication network, the first bridge device being connected to a data-supplying device via a first wired link, the second bridge device being connected to a data-consuming device by a second wired link. The method is such that each bridge device is able to be configured in one of the following modes: a nominal operating mode; an energy saving mode in which at least interfaces with one said wired link and with the communication network are active at reduced performance; and a stop mode in which, at least, the interface with the communication network is deactivated, and in which the interface with one said wired link is active at reduced performance. In addition: the first bridge device switches from the nominal operating mode to the stop mode following detection of deactivation of the first wired link; the first bridge device switches from the nominal operating mode to the energy saving mode following detection that the second bridge device is disconnected from the wireless communication network or that the second bridge device has gone into energy saving mode or following detection of a bidirectional traffic volume between said supplying device and said consuming device that is less than or equal to a predefined threshold; the second bridge device switches from the nominal operating mode to the stop mode following detection of deactivation of the second wired link; and the second bridge device switches from the nominal operating mode to the energy saving mode following detection that said consuming device has been put in hibernation or following detection of disconnection of the wireless communication network or detection of a bidirectional traffic volume between said supplying device and said consuming device that is less than or equal to a predefined threshold.

The invention also relates to a bridge device, referred to as first bridge device, of a data transmission system further comprising a second bridge device, the first and second bridge devices being aimed at being interconnected via a wireless communication network, the first bridge device being adapted for connecting a data-supplying device via a wired link, the second bridge device being adapted for being connected to a data-consuming device. The first bridge device is able to be configured in one of the following modes: a nominal operating mode; an energy saving mode in which, at least, an interface with said wired link and an interface with the communication network are active at reduced performance; and a stop mode in which, at least, the interface with the communication network is deactivated, and in which the interface with said wired link is active at reduced performance. In addition: the first bridge device is adapted for switching from the nominal operating mode to the stop mode following detection of deactivation of the wired link; and the first bridge device is adapted for switching from the nominal operating mode to the energy saving mode following detection that the second bridge device is disconnected from the wireless communication network or that the second bridge device has gone into energy saving mode or following detection of a bidirectional traffic volume between said supplying device and said consuming device that is less than or equal to a predefined threshold.

The invention also relates to a bridge device, referred to as second bridge device, of a data transmission system further comprising a first bridge device, the first and second bridge devices being aimed at being interconnected via a wireless communication network, the first bridge device being adapted for being connected to a data-supplying device, the second bridge device being adapted for connecting a data-consuming device via a wired link. The second bridge device is able to be configured in one of the following modes: a nominal operating mode; an energy saving mode in which, at least, an interface with said wired link and an interface with the communication network are active; and a stop mode in which, at least, the interface with the communication network is deactivated, and in which the interface with said wired link is active at reduced performance. In addition: the second bridge device is adapted for switching from the nominal operating mode to the stop mode following detection of deactivation of the wired link; and the second bridge device is adapted for switching from the nominal operating mode to the energy saving mode following detection that said consuming device has been put in hibernation or following detection of disconnection of the wireless communication network or following detection of a bidirectional traffic volume between said supplying device and said consuming device that is less than or equal to a predefined threshold.

The invention also relates to a method implemented by a first bridge device of a data transmission system further comprising a second bridge device, the first and second bridge devices being interconnected via a wireless communication network, the first bridge device being connected to a data-supplying device via a wired link, the second bridge device being connected to a data-consuming device. The method is such that the first bridge device is able to be configured in one of the following modes: a nominal operating mode; an energy saving mode in which, at least, an interface with said wired link and an interface with the communication network are active; and a stop mode in which, at least, the interface with the communication network is deactivated, and in which the interface with said wired link is active at reduced performance. In addition: the first bridge device switches from the nominal operating mode to the stop mode following detection of deactivation of the wired link; and the first bridge device switches from the nominal operating mode to the energy saving mode following detection that the second bridge device is disconnected from the wireless communication network or that the second bridge device has gone into energy saving mode or following detection of a bidirectional traffic volume between said supplying device and said consuming device that is less than or equal to a predefined threshold.

The invention also relates to a method implemented by a second bridge device in a data transmission system further comprising a first bridge device, the first and second bridge devices being interconnected by a wireless communication network, the first bridge device being connected to a data-supplying device, the second bridge device being connected to a data-consuming device via a wired link. The method is such that the second bridge device is able be configured in one of the following modes: a nominal operating mode; an energy saving mode in which, at least, an interface with said wired link and an interface with the communication network are active at reduced performance; and a stop mode in which, at least, the interface with the communication network is deactivated, and in which the interface with said wired link is at reduced performance. In addition: the second bridge device switches from the nominal operating mode to the stop mode following detection of deactivation of the wired link; and the second bridge device switches from the nominal operating mode to the energy saving mode following detection that said consuming device has been put in hibernation or following detection of disconnection of the wireless communication network or following detection of a bidirectional traffic volume between said supplying device and said consuming device that is less than or equal to a predefined threshold.

BRIEF DESCRIPTION OF THE SEVERAL VIEWS OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 1:
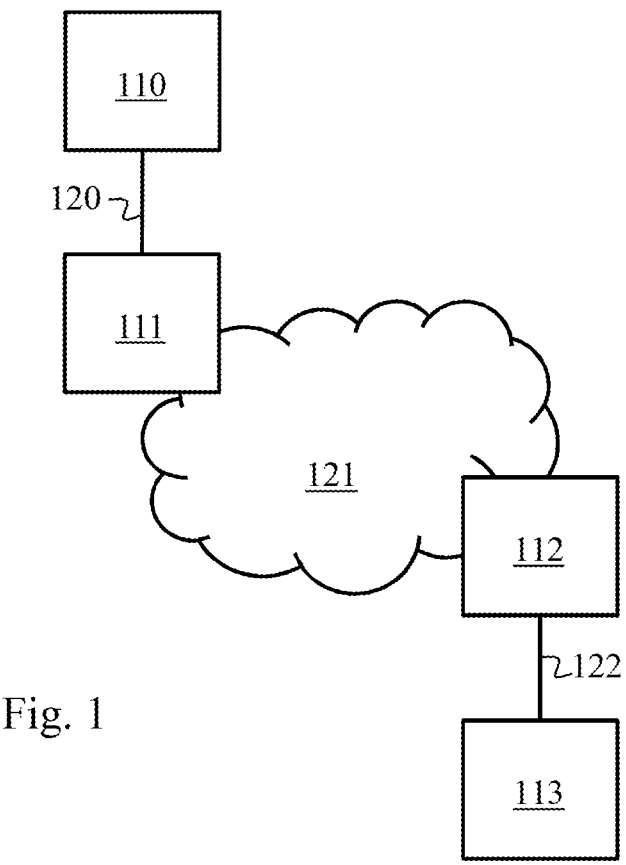
FIG. 1 schematically illustrates a data transmission system comprising a data-supplying device and a data-consuming device interconnected by a first bridge device and a second bridge device, and in which the present invention may be implemented.

FIG. 1 schematically illustrates a data transmission system in which the present invention may be implemented.

The data transmission system comprises a data-supplying device 110 and a data-consuming device 113. The data supplied by said supplying device 110 are preferentially audiovisual data and signaling data adapted for transporting said audiovisual data from said supplying device 110 to said consuming device 113. Other data may be supplied by said supplying device 110, such as broadcast data or maintenance data.

The supplying device 110 is for example a residential gateway receiving audiovisual data streams via the Internet (not shown in FIG. 1) and which are intended for said consuming device 113, which is for example an STB (Set-Top Box) decoding device.

In the data transmission system, said supplying device 110 and said consuming device 113 are interconnected via a first bridge device 111 and a second bridge device 112. Said supplying device 110 is connected to the first bridge device 111 via a first wired link 120, for example of the Ethernet type. Said consuming device 113 is connected to the second bridge device 112 via a second wired link 122. The first bridge device 111 is connected to the second bridge device 112 via a wireless communication network 121, for example of the Wi-Fi type. The first 111 and second 112 bridge devices interconnected by the wireless communication network 121 allow giving flexibility for installing the data transmission system, by avoiding a cable or a series of cables directly connecting said supplying device 110 and said consuming device 113.

When the wireless communication network 121 is of the Wi-Fi type, the first bridge device 111 takes the role of access point and the second bridge device 112 takes the role of client device. The role of access point or of client device is acquired automatically on start-up by the discovery of the equipment connected by the wired link to the bridge device concerned, or by analysis of the traffic received, for example by detection and analysis of DHCP (Dynamic Host Configuration Protocol) messages. The role of access point or client device may also be predefined, e.g. configuration of a memory register during manufacturing, or defined by a manual configuration (e.g. the presence of a switch on the bridge devices.

Each of the first 111 and second 112 bridge devices comprises a first interface for connecting one of the wired links and a second interface for connecting the wireless communication network. Each of the first 111 and second 112 bridge devices further comprises a processing unit providing a bridge between said first and second interfaces. Each of the processing units can be implemented in the form of a processor associated with a memory, in accordance with an architecture as presented below in relation to FIG. 2, or in the form of a dedicated component, such as an FPGA or ASIC. Each of the processing units may use a driver for the second interface, e.g. a Wi-Fi driver.

The first interface for connecting a wired link may be configured as follows: either fully active, meaning that the resources of said first interface available for the transmission of data from the supplying device 110 to said consuming device 113 are at a first level; or active at reduced performance, meaning that the resources available for the transmission of data from the supplying device 110 to said consuming device 113 are limited to a second level lower than the first level.

For example, when said first interface is of the Ethernet type, said first interface may be active at reduced performance by using energy saving mechanisms, such as "Energy Detect" or "Energy Detect+" as described in the patent application US 2012/042189 A1, or those described in the IEEE 802.3az standard. Considering the IEEE 802.3az standard, the absence of traffic via the wired link is advertised by sending an LPI (Low Power Idle) signal in replacement for an "Idle" signal. The LPI signal is transmitted regularly in order to maintain the concerned interfaces in a configuration where said interfaces are active at reduced performance. When the "Idle" signal reappears on the link, this means a return to a configuration where said interfaces are fully active, generally conditioned by a return of traffic upstream of these interfaces.

The second interface for connecting the wireless communication network 121 may be configured as follows: either fully active, meaning that the resources of said second interface available for transmitting data from the supplying device 110 to said consuming device 113 are at a first level; or active at reduced performance, meaning that the resources available for transmitting data from the supplying device 110 to said consuming device 113 are limited to a second level lower than the first level; or deactivated.

For example, when said second interface is of the Wi-Fi type, said second interface may be active at reduced performance by using a fall-back mechanism in SISO (Single Input Single Output) mode or in M×M (with 1<M<N) MIMO mode with regard to the first bridge device 111 or an energy saving mechanism of the PSPM type with regard to the second bridge device 112. Said second interface of the first bridge device 111 may in a variant be active at reduced performance by using a mechanism of alternation of periods of deactivation of said second interface and periods of fall-back in SISO mode or M×M MIMO mode; this alternation of active and inactive periods is sometimes referred to as "doze mode".

It should be noted that the header of the Wi-Fi frames includes information indicating whether the second interface 312 of the first bridge device 111 and the second interface 322 of the second bridge device 112 are fully active (see CAM mode, standing for "Constantly Available Mode") or active at reduced performance (PSPM mode).

Thus, considering that the wireless communication network is of the Wi-Fi type, even when the second bridge device 112 has configured its interface with the Wi-Fi network so as to be active at reduced performance, it is possible for the first bridge device 111 to transmit data to the second bridge device 112. The first bridge device 111 updates TIM (Traffic Indication Map) information, indicating that data are awaiting availability of the second bridge device 112. The second bridge device 112 performs periodic checks in order to check whether the TIM information indicates that a message is awaiting said second bridge device 112. The second bridge device 112 then sends a PS-POLL (Power Save Poll) message in order to advertise to the first bridge device 111 that the second bridge device 112 is ready to receive the awaiting data.

Each of the processing units may be preferentially configured in the following manner: either fully active, meaning that the resources of said processing unit available for the transmission of data from the supplying device 110 to said consuming device 113 are at a first level; or active at reduced performance, meaning that the resources of said processing unit available for the transmission of data from the supplying device 110 to said consuming device 113 are limited to a second level lower than the first level; or deactivated.

For example, when said processing unit is a processor, said processing unit may be active at reduced performance by reducing the operation frequency of said processor, and be deactivated by using an energy saving mechanism of the "Suspend to RAM" type. It may also happen that said processing unit does not support a mechanism of the "Suspend to RAM" type. In this case, said processing unit remains fully active or active at reduced performance in the scenarios presented below. It is however considered in the scenarios presented below that each processing unit does not support a mechanism of the "Suspend to RAM" type.

Figure 2:
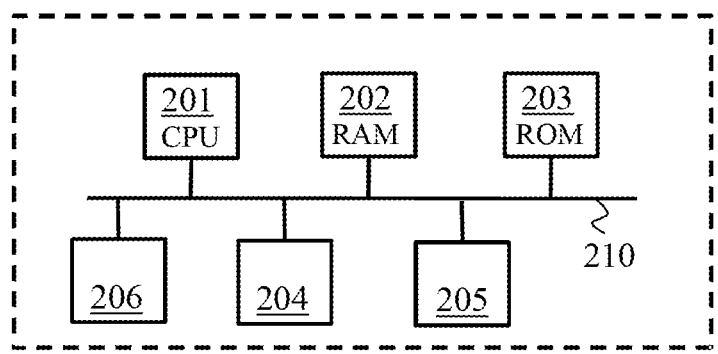
FIG. 2 schematically illustrates an example of hardware architecture of the first bridge device and/or of the second bridge device of the system in FIG. 1.

FIG. 2 schematically illustrates an example of hardware architecture of the first bridge device 111 and/or of the second bridge device 112. Let us consider that FIG. 2 represents the first bridge device 111. The first bridge device 111 then comprises, connected by a communication bus 210: a processor or CPU (Central Processing Unit) 201; a Random Access Memory RAM 202; a Read Only Memory ROM 203; a storage unit or a storage medium reader, such as an SD (Secure Digital) card reader 204 or a Hard Disk Drive HDD; a first interface 205 for connecting the first bridge device 111 to said supplying device 110 via the first wired link 120; and a second interface 206 for connecting the first bridge device 111 to the second bridge device 112 via the wireless communication network 121.

When FIG. 2 depicts an example of hardware architecture of the second bridge device 112, the first interface 205 enables connecting the second bridge device 112 to said consuming device 113 via the second wired link 122, and the second interface 206 enables connecting the second bridge device 112 to the first bridge device 111 via the wireless communication network 121.

The processor 201 is capable of executing instructions loaded in the RAM 202 from the ROM 203, from an external memory, from a storage medium, or from a communication network. When the first bridge device 111 is powered up, the processor 201 is capable of reading instructions from the RAM 202 and executing them. These instructions form a computer program causing the implementation, by the processor 201, of all or some of the algorithms and steps described here in relation to the first bridge device 111. Likewise, when the second bridge device 112 is powered up, the processor 201 is capable of reading instructions from the RAM 202 and executing them. These instructions form a computer program causing the implementation, by the processor 201, of all or some of the algorithms and steps described here in relation to the second bridge device 112.

Thus all or some of the algorithms and steps described here may be implemented in software form by the execution of a set of instructions by a programmable machine, such as a DSP (Digital Signal Processor) or a microcontroller. All or some of the algorithms and steps described here may also be implemented in hardware form by a machine or a dedicated component, such as an FPGA (Field-Programmable Gate Array) or an ASIC (Application-Specific Integrated Circuit).

FIGS. 3A to 3E, 4A to 4C, 10A to 10D and 11A to 11C schematically illustrate scenarios in which the data transmission system switches from a nominal operating state to a partial switched-off state, or vice-versa. These scenarios have various possible states of partial switching off of the data transmission system, since each of the devices constituting the data transmission system may be in various possible configurations.

FIGS. 5A to 5D, 6A to 6C, 7A to 7C, 8A to 8C, 9A and 9B schematically illustrate scenarios in which the data transmission system switches from a nominal operating state to a hibernation state, or vice-versa. These scenarios present various possible states of hibernation of the data transmission system since each of the devices constituting the data transmission system may be in various possible configurations.

Figure 3A:
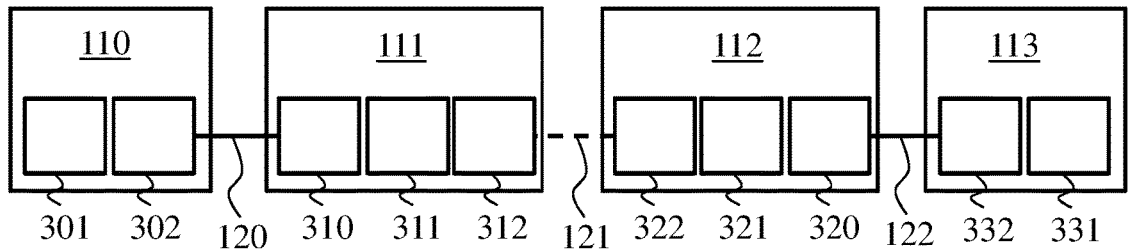
FIGS. 3A to 3E schematically illustrate a first scenario in which the data transmission system passes from a nominal operating state to a partial switched-off state.

It is shown in these FIGS. that the supplying device 110 comprises a processing unit 301 and an interface 302 for connecting said supplying device 110 to the first bridge device 111. It is also shown in FIG. 3A that said consuming device 113 comprises a processing unit 331 and an interface 332 for connecting said consuming device 113 to the second bridge device 112. It is also shown in these FIGS. that the first bridge device 111 comprises a processing unit 311, a first interface 310 for connecting the first bridge device 111 to said supplying device 110 and a second interface 312 for connecting the first bridge device 111 to the second bridge device 112. Finally, it is shown in these FIGS. that the second bridge device 112 comprises a processing unit 321, a first interface 320 for connecting the second bridge device 112 to said consuming device 113 and a second interface 322 for connecting the second bridge device 112 to the first bridge device 111.

Said supplying device 110 may be in one of three different operating modes: a nominal operating mode in which the components constituting said supplying device 110 are fully active; an energy saving mode in which the components constituting said supplying device 110 are active at reduced performance; and a stop mode in which the components constituting said supplying device 110 are deactivated.

In the scenarios presented below, it is considered that the supplying device 110 is not performing any actions other than those rendered necessary by the data exchanges with the consuming device 113. If the supplying device 110 shall perform actions other than those rendered necessary by the data exchanges with the consuming device 113, then the fact that such other actions are or are not under way is taken into account before enabling said supplying device 110 to be put in energy saving mode or stop mode.

Said consuming device 113 may be in one of three different operating modes: a nominal operating mode in which the components constituting said consuming device 113 are fully active; an energy saving mode in which the components constituting said consuming device 113 are active at reduced performance; and a stop mode in which the components constituting said consuming device 113 are deactivated.

In the scenarios presented below, it is considered that the consuming device 113 is not performing any actions other than those rendered necessary by the data exchanges with the supplying device 110. If the consuming device 113 must perform actions other than those rendered necessary by the data exchanges with the supplying device 110, then the fact that such other actions are or are not under way is taken into account before enabling said consuming device 113 to be put in energy saving mode or stop mode.

Each of the first 111 and second 112 bridge devices may be in one of three different operating modes: a nominal operating mode in which the components constituting said bridge device are fully active; an energy saving mode in which at least the interfaces (with the wired link concerned and with the communication network 121) are active at reduced performance; and a stop mode in which at least the interface with the communication network 121 is deactivated and in which the interface with the wired link concerned is active at reduced performance.

FIG. 3A schematically illustrates the data transmission system in a nominal operating state, meaning in which each of the devices constituting said system is in a nominal operating mode. Said supplying device 110 and said consuming device 113 are operational and connected to each other via the first 111 and second 112 bridge devices. All the interfaces of the first 111 and second 112 bridge devices, of said supplying device 110 and of said consuming device 113 have been initialised, and are active and operational. All the processing units of the first 111 and second 112 bridge devices, of said supplying device 110 and of said consuming device 113 have been initialised and are active and operational. Such a configuration of the data transmission system enables passing a maximum flow of data between said supplying device 110 and said consuming device 113.

Considering that the first 120 and second 122 wired links are of the Ethernet type, the corresponding interfaces of the first 111 and second 112 bridge devices, of said supplying device 110 and of said consuming device 113 are configured so that the first 120 and second 122 wired links are negotiated at the maximum speed of the capabilities of the data transmission system. Considering that the wireless communication network 121 is of the Wi-Fi type, the corresponding interfaces of the first 111 and second 112 bridge devices are configured so as to be in CAM mode, meaning that all the corresponding radio channels are active in N×N (N>1) MIMO mode in the 5 GHz frequency band.

FIGS. 3B to 3E schematically illustrate the passage of the data transmission system from the nominal operating state to a partial switched-off state.

Figure 3B:
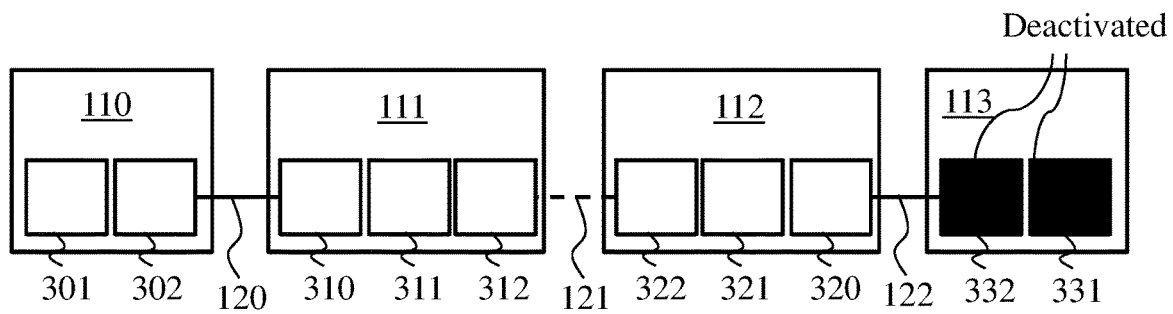
Figure 3C:
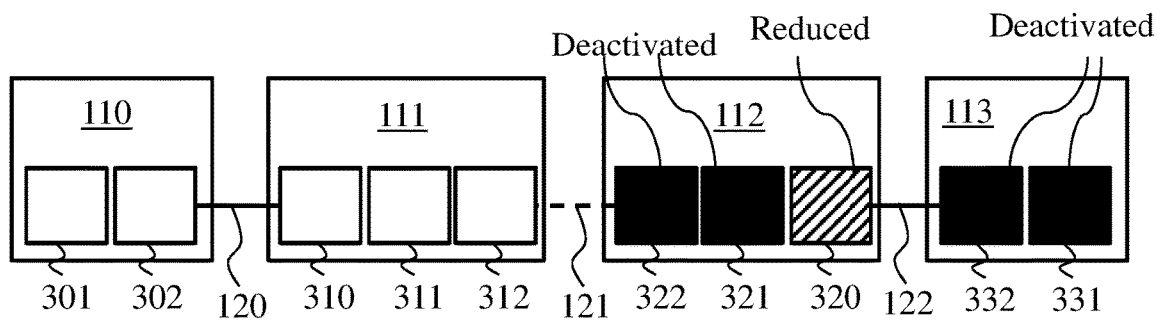
Figure 3D:
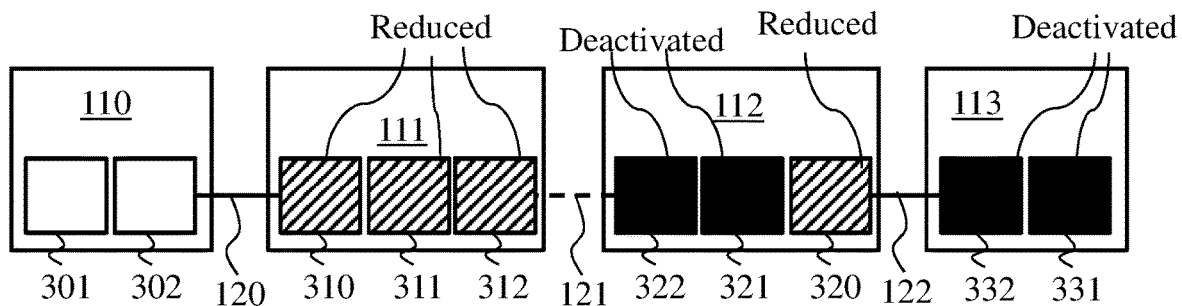

FIG. 3B schematically illustrates the data transmission in an operating state in which said consuming device 113 has received a stop command, while the data transmission system up until then was in a nominal operating state as illustrated in FIG. 3A. Such a command is for example received following a user action on a dedicated button of said consuming device 113 or of a remote control associated with said consuming device 113. As a result said consuming device 113 goes into stop mode, by deactivating the interface 332, as well as the processing unit 331. The second wired link 122 then becomes inactive. The fact that the interface 332 and the processing unit 331 are deactivated is depicted thanks to black squares in FIG. 3B.

The passage of said consuming device 113 into stop mode is detected by the interface 320 of the second bridge device 112 since the deactivation of the interface 332 has caused deactivation of the second wired link 122. The interface 320 is then reconfigured so as to be active at reduced performance, after optionally expiry of a timer of predefined duration. This reconfiguration of the interface 320 allows achieving energy saving, while preserving ability to detect a return of activity of said consuming device 113 by reactivation of the second wired link 122, as described in the Energy Detect or Energy Detect+ mechanisms or in accordance with the IEEE 802.3az standard. The result is a deactivation of the interface 322 of the second bridge device 112 and deactivation, if possible, of the processing unit 321. Reactivation of the processing unit 321 may subsequently be achieved thanks to a wake-up signal coming from the interface 320. The second bridge device 112 is then disconnected from the wireless communication network 121. The fact that the interface 322 and the processing unit 321 are deactivated is depicted thanks to black squares in FIG. 3C, and the fact that the interface 320 is active at reduced performance is depicted thanks to a hatched square in FIG. 3C. Thus the second bridge device 112 is configured in stop mode.

The disconnection of the second bridge device 112 of the wireless communication network 121 by deactivation of the interface 322 is detected by the interface 312 of the first bridge device 111. The interface 312 is then reconfigured so as to be active at reduced performance, in order to enable detecting subsequent reconnection of the second bridge device 112 to the wireless communication network 121. The result is a reconfiguration of the interface 310 of the first bridge device 111 and if possible of the processing unit 311, so as to be active at reduced performance. The first wired link 120 however remains active. The fact that the interface 310, the interface 312 and the processing unit 311 are configured so as to be active at reduced performance is depicted thanks to hatched squares in FIG. 3D. Thus the first bridge device 111 is configured in energy saving mode.

The passage of the first bridge device 111 into energy saving mode is detected by the interface 302 of said supplying device 110. In a first embodiment, in the context of the IEEE 802.3az standard, the passage into energy saving mode is advertised by regular transmission of the LPI signal. In a second embodiment, according to the Energy Detect+ mechanism, the passage into energy saving mode is advertised by the absence of signals coming from the interface 310. The interface 302 is then reconfigured so as to be active at reduced performance, in order to enable detecting a return of activity of the first bridge device 111 by the return of traffic via the first wired link 120. The result is a reconfiguration, if possible, of the processing unit 301 so as to be active at reduced performance. The fact that the interface 302 and the processing unit 301 are reconfigured so as to be active at reduced performance is depicted thanks to the hatched squares in FIG. 3E. Thus said supplying device 110 is configured in energy saving mode. The data transmission system is then in a partial switched-off state. The data transmission system is then configured in an optimised manner in terms of energy consumption and is able to wake up on return of activity of said consuming device 113.

Figure 4A:
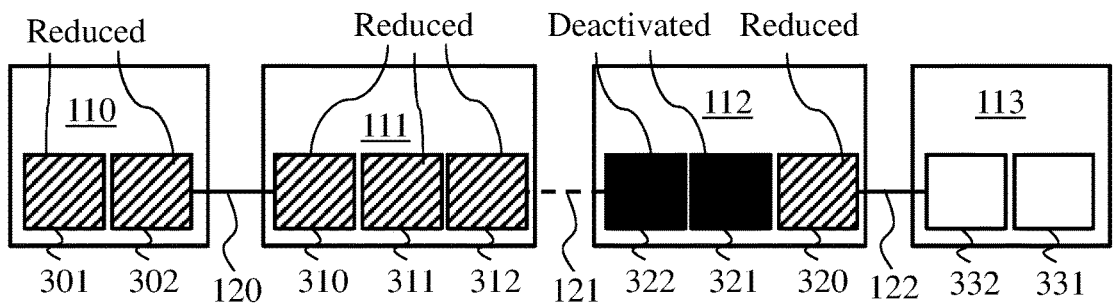
FIGS. 4A to 4C schematically illustrate a first scenario in which the data transmission system passes from a partial switched-off state to the nominal operating state.
Figure 4B:
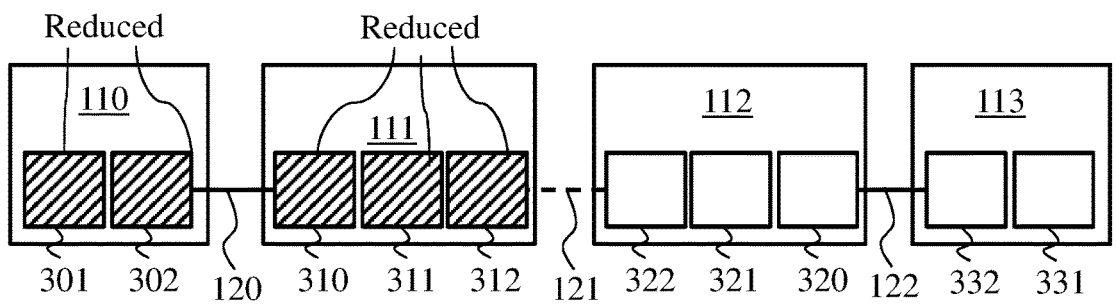
Figure 4C:
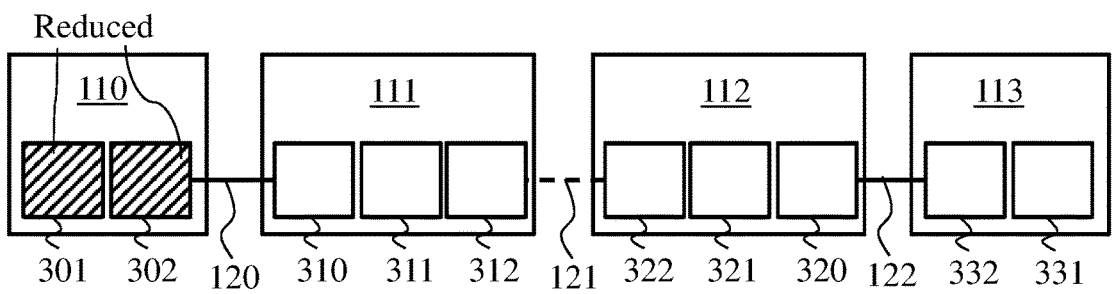

FIGS. 4A to 4C schematically illustrate a first scenario in which the data transmission system passes from a partial switched-off state to the nominal operating state.

Figure 3E:
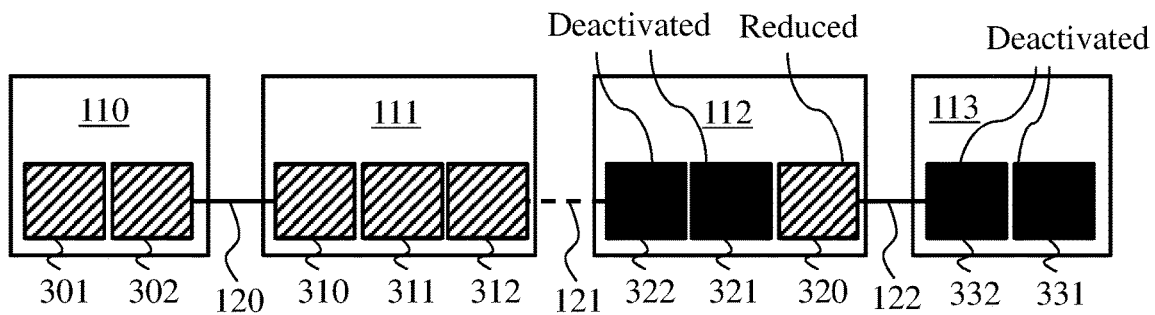

The data transmission system is in the partial switched-off state depicted in FIG. 3E when said consuming device 113 receives a switching-on command. Such a command is for example received following a user action on a dedicated button of said consuming device 113 or of a remote control associated with said consuming device 113. The result is a reconfiguration of the interface 332 and, if necessary, of the processing unit 331 so as to be fully active. This situation is depicted in FIG. 4A. The fact that the interface 332 and the processing unit 331 are configured so as to be fully active is depicted by white squares in FIG. 4A. Thus said consuming device 113 is in nominal operating mode. The passage of said consuming device 113 into nominal operating mode is detected by the interface 320 of the second bridge device 112 via the second wired link 122, since the interface 320 had remained listening for a reactivation of the second wired link 122 by the interface 332. For example, reconfiguration of the interface 332 so as to be fully active involves a link negotiation procedure starting with the sending of NLP (Normal Link Pulse) signals, as described in IEEE 802.3 clause 28.

This activity is detected by the interface 320, for example in accordance with the Energy Detect or Energy Detect+ mechanisms or in accordance with the IEEE 802.3az standard. The interface 320 is then reconfigured so as to be fully active and the interface 320 wakes up the processing unit 321 so that the processing unit 321 is reconfigured so as to be fully active. The interface 322 is then reconfigured so as to be fully active and the second bridge device 112 effects a reconnection to the wireless communication network 121. This situation is shown in FIG. 4B. The fact that the interface 320, the interface 322 and the processing unit 321 are configured to be fully active is depicted by white squares in FIG. 4B. The second bridge device 112 is then in nominal operating mode.

The reconnection of the second bridge device 112 to the wireless communication network 121 is detected by the interface 312 of the first bridge device 111, since the interface 312 had remained listening for a reconnection of the second bridge device 112 to the wireless communication network 121. The interface 312 is then reconfigured so as to be fully active. As a result the processing unit 311 and the interface 310 are also reconfigured so as to be fully active, which causes reactivation of the first wired link 120. This situation is shown in FIG. 4C. The fact that the interface 310, the interface 312 and the processing unit 311 are configured so as to be fully active is depicted by white squares in FIG. 4C. The first bridge device 111 is then in nominal operating mode.

The passage of the first bridge device 111 into nominal operating mode is detected by the interface 302 of said supplying device 110 via the first wired link 120 since the interface 302 of said supplying device 110 had remained listening for a return of activity of the first bridge device 111 via the first wired link 120. For example, in accordance with the Energy Detect+ mechanism, reconfiguration of the interface 310 so as to be fully active involves a link negotiation procedure starting with the sending of NLP signals. The interface 302 and the processing unit 301 of said supplying device 110 are then reconfigured so as to be fully active. Thus said supplying device 110 is in nominal operating mode. The data transmission system is then once again in the nominal operating state, namely in the configuration illustrated in FIG. 3A.

FIGS. 5A to 5D schematically illustrate a first scenario in which the data transmission system passes from the nominal operating state to a hibernation state.

Figure 5A:
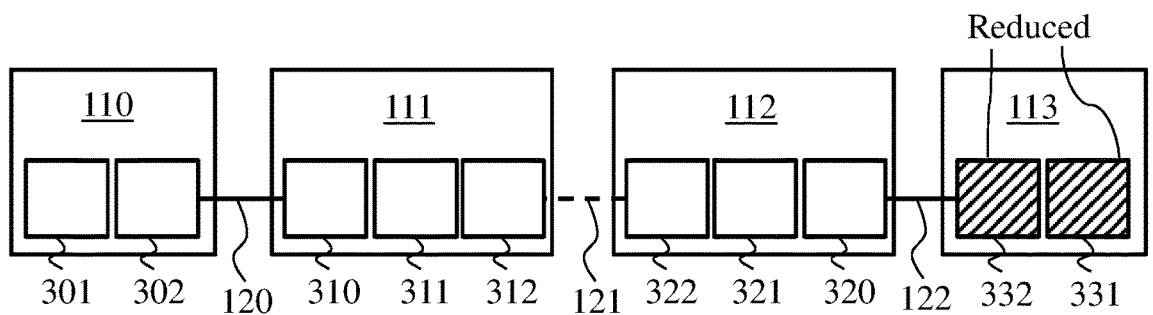
FIGS. 5A to 5D schematically illustrate a first scenario in which the data transmission system passes from the nominal operating state to a hibernation state.

FIG. 5A schematically illustrates the data transmission system in an operating state in which said consuming device 113 has received a hibernation command while the data transmission system was in a nominal operating state as illustrated in FIG. 3A.

Such a command is for example received following a user action on a dedicated button of said consuming device 113 or of a remote control associated with said consumer device 113. As a result said consuming device 113 is put in energy saving mode. The interface 332 and, if possible, the processing unit 331 are then reconfigured so as to be active at reduced performance. The second wired link 122 then has reduced performances, the interface 332 remaining listening for an awakening by the interface 320 of the second bridge device 112. The fact that the interface 332 and the processing unit 331 are configured so as to be active at reduced performance is depicted thanks to hatched squares in FIG. 5A.

Putting the consuming device 113 in energy saving mode is detected by the second bridge device 112. According to a first example, the second bridge device 112 regularly sends a probe message to said consuming device 113, e.g. a message of the ping type, in order to test whether said consuming device 113 has been put in hibernation. According to a second example, when said supplying device 110 and said consuming device 113 implement the UPnP (Universal Plug n' Play) Low Power standard as defined in "UPnP Low Power Architecture v1.0", the second bridge device 112 detects that said consuming device 113 has been put in hibernation by analysis of the UPnP Low Power traffic between the supplying device 110 and the consuming device 113. In particular, the second bridge device 112 seeks to detect messages of the "Bye-bye" type with information called powerstate parameterised at a value called "Deep Sleep Online". According to a third example, the second bridge device 112 receives from said consuming device 113 a message indicating that said consuming device 113 is being put in hibernation, before actually applying the hibernation.

Figure 5B:
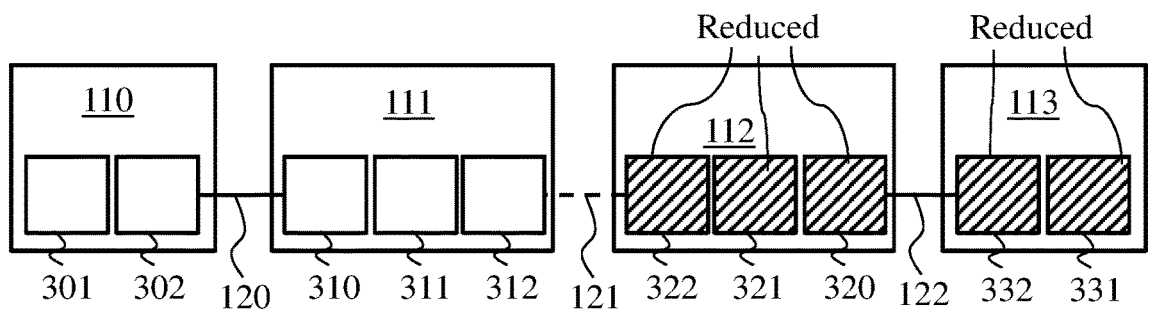
Figure 5C:
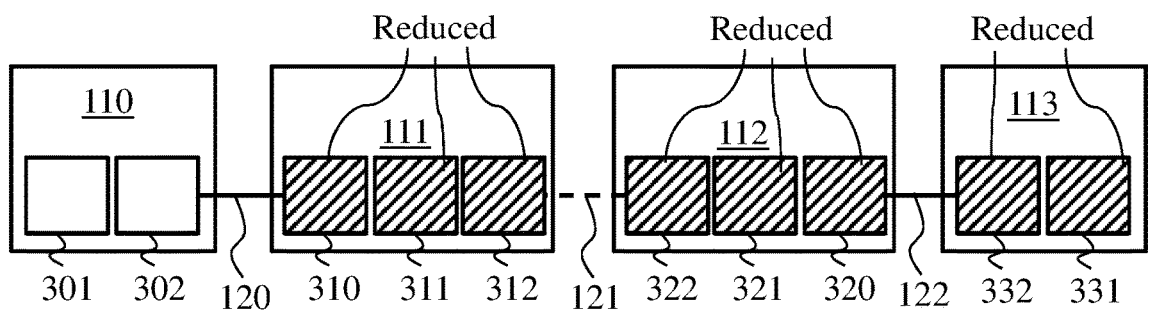

The second bridge device 112 then reconfigures the interface 320, the interface 322 and the processing unit 321 so as to be active at reduced performance. Such a reconfiguration of the interface 320 enables the second bridge device 112 to remain listening for a return of said consuming device 113 to nominal operating mode. Such a reconfiguration of the interface 322 enables the second bridge device 112 to remain listening for requests for putting said consuming device 113 in nominal operating mode which would come from the wireless communication network 121. This situation is shown in FIG. 5B. The fact that the interface 320, the interface 322 and the processing unit 321 are configured so as to be active at reduced performance is shown by hatched squares in FIG. 5B. The second bridge device 112 is then in energy saving mode.

Putting the interface 322 of the second bridge device 112 in energy saving mode is detected by the interface 312 of the first bridge device 111. For example, in the case of a Wi-Fi network, the first bridge device detects the passage of the second bridge device 112 from CAM mode or PSPM mode. The interface 312 is then reconfigured so as to be active at reduced performance, to allow detecting a return of the second bridge device 112 to nominal operating mode. The result is a reconfiguration of the interface 310 and of the processing unit 311 so as to be active at reduced performance. The first wired link 120 then has reduced performances, the interface 310 remaining listening for a reawakening of said supplying device 110 by the interface 302. The fact that the interface 310, the interface 312 and the processing unit 311 are configured so as to be active at reduced performance is shown thanks to hatched squares in FIG. 5C. The first bridge device 111 is then in energy saving mode.

Putting the first bridge device 111 in energy saving mode is detected by the interface 302 of said supplying device 110. For example, as already indicated, in the context of the IEEE 802.3az standard, the passage into energy saving mode is advertised by the regular transmission of the LPI signal. The interface 302 is then reconfigured so as to be active at reduced performance, in order to allow detecting a return to activity of the first bridge device 111. The result is a reconfiguration of the processing unit 301 so as to be active at reduced performance. The fact that the interface 302 and the processing unit 301 are configured so as to be active at reduced performance is depicted thanks to hatched squares in FIG. 5D. The supplying device 110 is then in energy saving mode. The data transmission system is then configured in an optimised manner in terms of energy consumption and is able to awake up in the case where the transmission of data from said supplying device 110 to said consuming device 113 shall resume in nominal mode (e.g. transmission of video data).

Figure 6A:
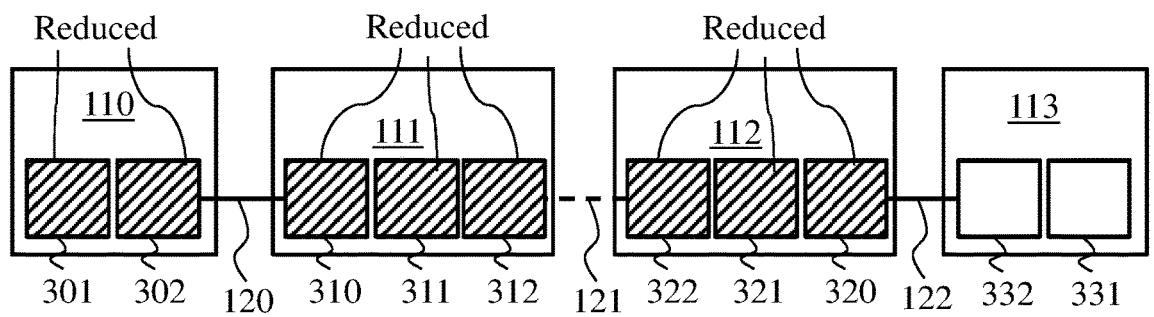
FIGS. 6A to 6C schematically illustrate a first scenario in which the data transmission system passes from a hibernation state to the nominal operating state.
Figure 6B:
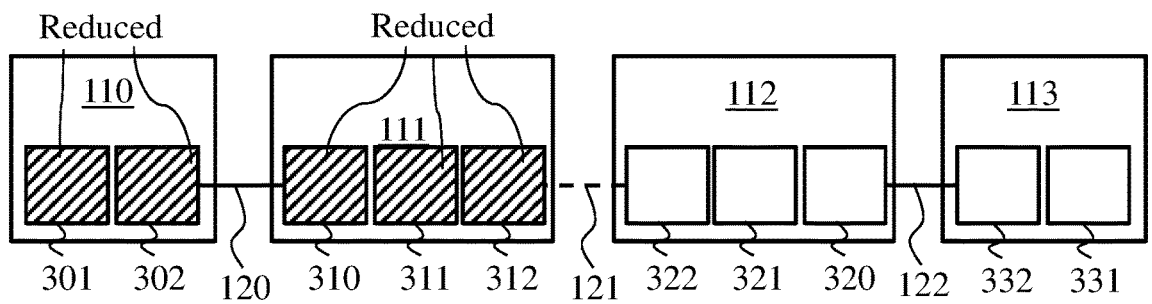
Figure 6C:
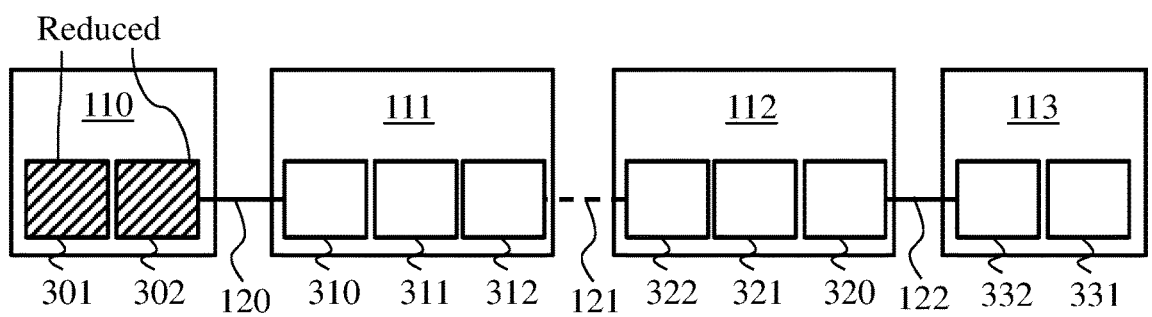

FIGS. 6A to 6C schematically illustrate a first scenario in which the data transmission system passes from a hibernation state to the nominal operating state.

Figure 5D:
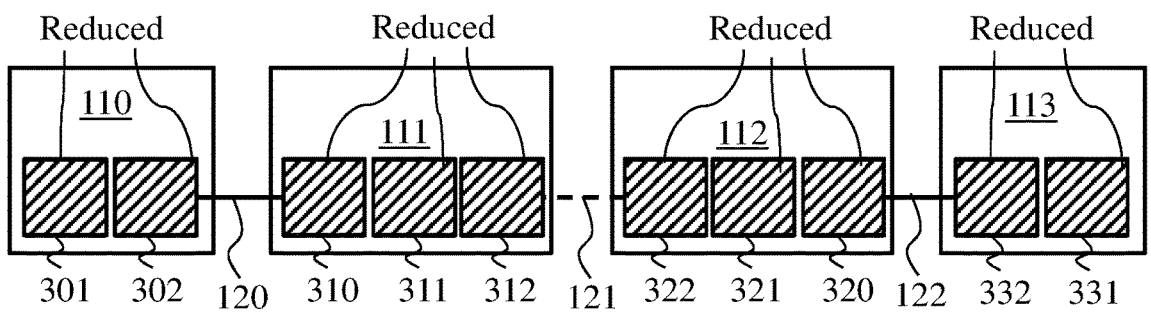

The data transmission system is in a hibernation state, as shown in FIG. 5D, when said consuming device 113 receives a switch-on command. Such a command is for example received following a user action on a dedicated button of said consuming device 113 or of a remote control associated with said consuming device 113. The result is a reconfiguration of the interface 332 and of the processing unit 331 so as to be fully active. This situation is shown in FIG. 6A. The fact that the interface 332 and the processing unit 331 are configured so as to be fully active is shown by white squares in FIG. 6A. Said consuming device 113 is then in nominal operating mode.

The return of said consuming device 113 to nominal operating mode is detected by the interface 320 of the second bridge device 112 via the second wired link 122, since the interface 320 had remained listening for a return of said consuming device 113 to activity via the second wired link 122. For example, as already indicated, in accordance with the Energy Detect+ mechanism, reconfiguration of the interface 332 so as to be fully active involves a link negotiation procedure starting with the transmission of NLP signals. In another example, the traffic generated by the consuming device 113 emerging from its hibernation allows detection of the return of the consuming device 113 to nominal operating mode. The interface 320 and the processing unit 321 are then reconfigured so as to be fully active. The interface 322 is then also reconfigured so as to be fully active. This situation is shown in FIG. 6B. The fact that the interface 320, the interface 322 and the processing unit 321 are configured so as to be fully active is shown by white squares in FIG. 6B. The second bridge device 112 is then in energy saving mode.

The return of the second bridge device 112 to nominal operating mode is detected by the interface 312 of the first bridge device 111 via the wireless communication network 121. It is for example possible to rely on packets sent by the consuming device 113 which, following its initialisation, seeks to make contact with the supplying device 110. It is also possible for the second bridge device 112 to send a specific message to the first bridge device 111 to indicate the passage from PSPM mode to CAM mode. The interface 312 is then reconfigured so as to be fully active. The processing unit 311 is also reconfigured so as to be fully active, as well as the interface 310. This situation is depicted in FIG. 6C. The fact that the interface 310, the interface 312 and the processing unit 311 are configured so as to be fully active is shown by white squares in FIG. 6C. The first bridge device is then in nominal operating mode.

The return of the first bridge device 111 to nominal operating mode is detected by the interface 302 of said supplying device 110 via the link 120, since the interface 302 of said supplying device 110 had remained listening for a return of activity of the first bridge device 111 via the first wired link 120. For example, as already indicated, in accordance with the Energy Detect+ mechanism, reconfiguration of the interface 310 so as to be fully active involves a link negotiation procedure starting with the transmission of NLP signals. In another example, reconfiguration of the interfaces 310 and 312 so as to be fully active may rely on the IEEE 802.3az standard as a result of the traffic generated by the consuming device 113 and passing through these interfaces. The interface 302 and, if necessary, the processing unit 301 are then reconfigured so as to be fully active. Said supplying device 110 is then in nominal operating mode. The data transmission system is then the nominal operating state, namely in the configuration illustrated by FIG. 3A.

Figure 7A:
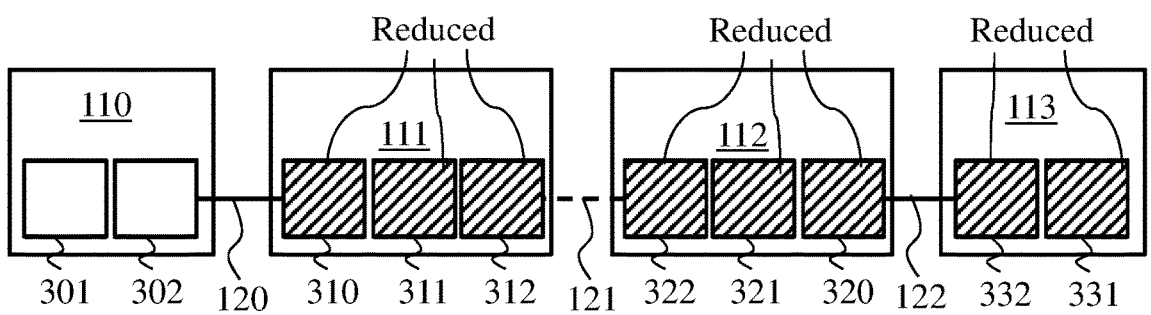
FIGS. 7A to 7C schematically illustrate a second scenario in which the data transmission system passes from a hibernation state to the nominal operating state.
Figure 7B:
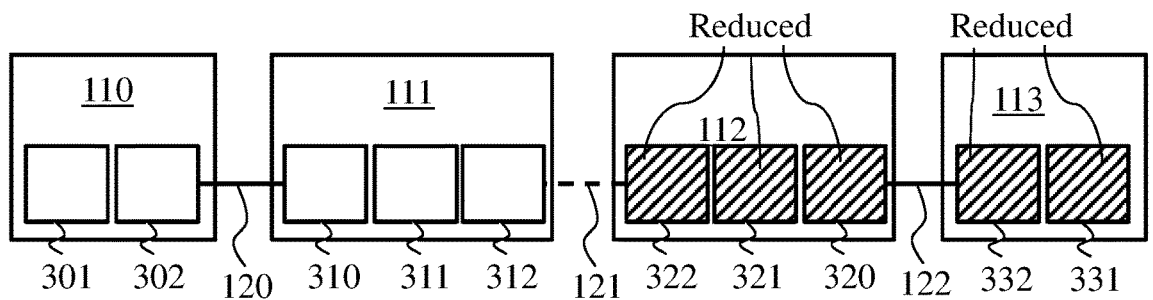
Figure 7C:
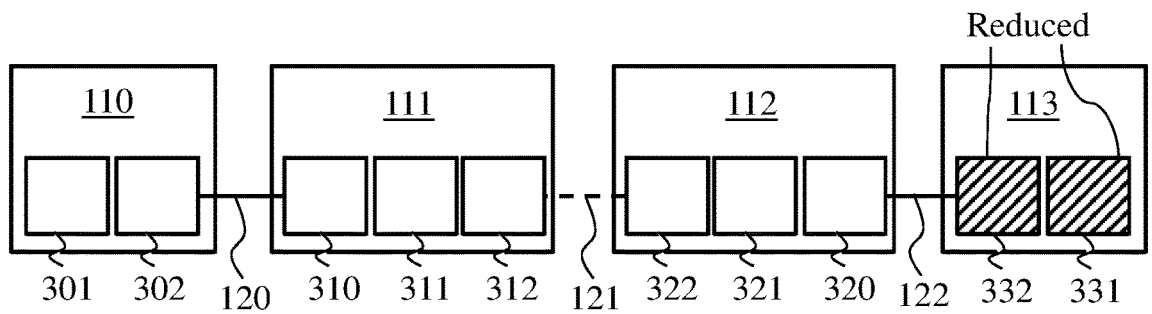

FIGS. 7A to 7C schematically illustrate a second scenario in which the data transmission system passes from a hibernation state to the nominal operating state.

The data transmission system is in a hibernation state, as shown in FIG. 5D, when said supplying device 110 receives an instruction or command involving a transmission by said supplying device 110 of a request for putting said consuming device 113 in nominal operating mode. For example, such a request for putting said consuming device 113 in nominal operating mode takes the form of a magic packet according to the "Wake on LAN" standard. This magic packet is an Ethernet frame containing the bytes FF FF FF FF FF FF (in hexadecimal) followed by sixteen repetitions of the MAC address of said consuming device 113. Following this instruction or command, the processing unit 301 and the interface 302 are reconfigured so as to be fully active. This situation is shown in FIG. 7A. The fact that the interface 302 and the processing unit 301 are configured so as to be fully active is shown by white squares in FIG. 7A. The supplying device 110 is then in nominal operating mode.

The return of said supplying device 110 to nominal operating mode is detected by the interface 310 of the first bridge device 111 via the link 120, since the interface 310 had remained listening for a return of said supplying device 110 to nominal operating mode via the first wired link 120. For example, as already indicated, in accordance with the Energy Detect+ mechanism, reconfiguration of the interface 302 so as to be fully active involves a link negotiation procedure starting with the sending of NLP signals. The interface 310 and, if possible, the processing unit 311 are then reconfigured so as to be fully active. The first bridge device 111 then receives the request for putting said consuming device 113 in nominal operating mode. The interface 312 is then reconfigured so as to be fully active. This situation is shown in FIG. 7B. The fact that the interface 310, the interface 312 and the processing unit 311 are configured so as to be fully active is shown by white squares in FIG. 7B. The first bridge device 111 is then in nominal operating mode.

The return of the first bridge device 111 to nominal operating mode is detected by the interface 320 of the second bridge device 112 via the wireless communication network 121. Considering that the wireless communication network 121 is of the Wi-Fi type, the first bridge device 111 updates the already-mentioned TIM information, indicating that a message (the request for putting said consuming device 113 in nominal operating mode) is awaiting availability of the second bridge device 112. During a periodic check made by the second bridge device 112 via the interface 322, said second bridge device 112 detects that the TIM information indicates that a message is awaiting the second bridge device 112. The interface 322 and the processing unit 321 are then reconfigured so as to be fully active. The second bridge device 112 then receives the request for putting said consuming device 113 in nominal operating mode. In addition, the interface 320 is reconfigured so as to be fully active. This situation is depicted in FIG. 7C. The fact that the interface 320, the interface 322 and the processing unit 321 are configured so as to be fully active is shown by white squares in FIG. 7C. The second bridge device 112 is then in nominal operating mode.

The return of the second bridge device 112 to nominal operating mode is detected by the interface 332 of said consuming device 113 via the second wired link 122 by virtue of the reception by the interface 332 of the request for putting in nominal operating mode addressed to said consuming device 113, since the interface 332 had remained listening for a return to activity of the second bridge device 112 via the second wired link 122. The interface 332 and the processing unit 331 are then reconfigured so as to be fully active. Said consuming device 113 is then in nominal operating mode. The data transmission system is then in nominal operating state, meaning in the configuration illustrated by FIG. 3A.

Figure 8A:
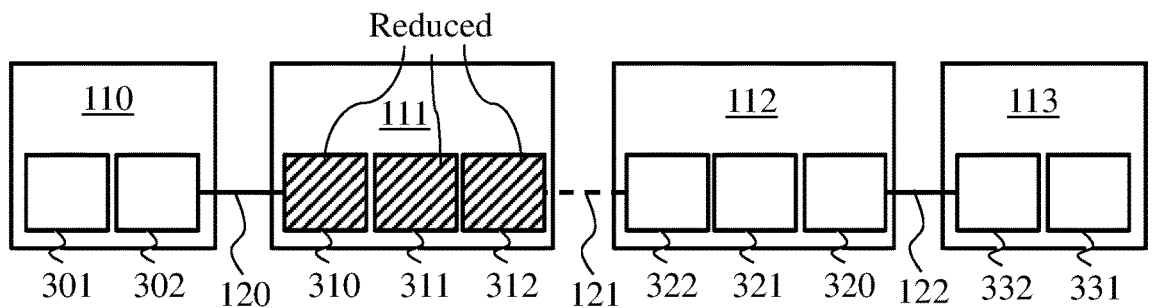
FIGS. 8A to 8C schematically illustrate a second scenario in which the data transmission system passes from the nominal operating state to a hibernation state.
Figure 8B:
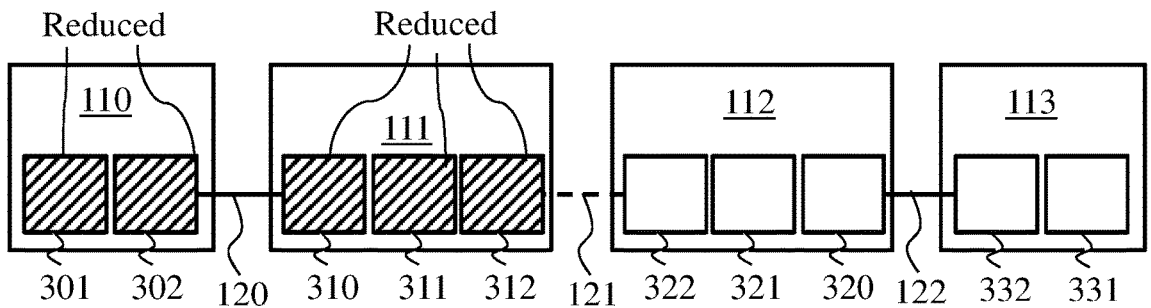
Figure 8C:
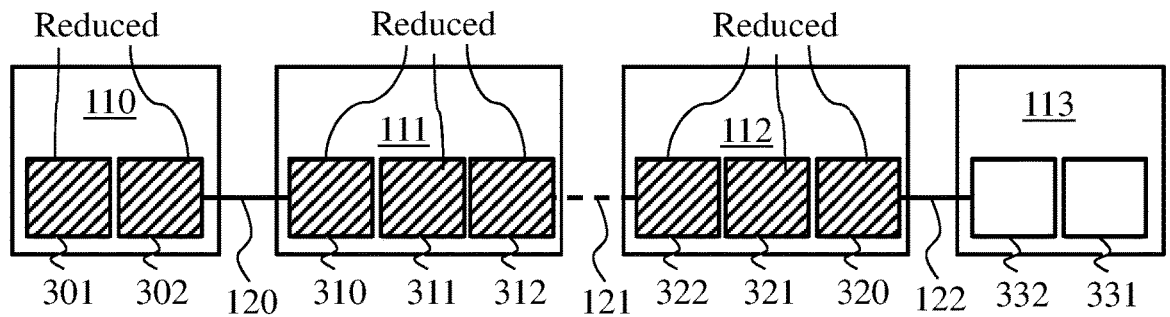

FIGS. 8A to 8C schematically illustrate a second scenario in which the data transmission system passes from the nominal operating state to a hibernation state.

The first bridge device 111 and the second bridge device 112 are adapted for analysing the volume of data traffic between said supplying device 110 and said consuming device 113. When the volume of traffic from said supplying device 110 to said consuming device 113 is less or equal to a first threshold TH1 during a predefined time window and when the volume of traffic from said consuming device 113 to said supplying device 110 is less than or equal to a second threshold TH2 during said predefined time window, the first bridge device 111 and the second bridge device 112 trigger a putting of the data transmission system in hibernation. The first TH1 and second TH2 thresholds may be fixed at 0, and may be different for the first bridge device 111 and the second bridge device 112. Fixing the first TH1 and second TH2 thresholds at a non-zero value allows avoiding exchanges (such as broadcast data or maintenance data) relating to maintaining in place the wireless data transmission system. Analysis of the volume of data traffic may also be done using respective triggering thresholds in queues of the bridge function of said first 111 and second 112 bridge devices. When a queue contains waiting data beyond the triggering threshold of said queue, it is considered that the traffic volume requires a return to nominal operating mode.

The data transmission system is initially in the nominal operating state as shown in FIG. 3A. Let us consider that the first bridge device 111 detects a low level (i.e. less than or equal to a predefined threshold) of bidirectional traffic between said supplying device 110 and said consuming device 113. The processing unit 311, the interface 310 and the interface 312 are then reconfigured so as to be active at reduced performance. This situation is shown in FIG. 8A. The fact that the interface 310, the interface 312 and the processing unit 311 are configured so as to be active at reduced performance is shown by hatched squares in FIG. 8A. The first bridge device 111 is then in energy saving mode.

The passage of the first bridge device 111 into energy saving mode is detected by the interface 302 of said supplying device 110. For example, as already indicated, in the context of the IEEE 802.3az standard, the passage into energy saving mode is advertised by the regular sending of the LPI signal. The interface 302 is then reconfigured so as to be active at reduced performance, to enable detecting a return to activity of the first bridge device 111 via the first wired link 120. The processing unit 301 is also reconfigured so as to be active at reduced performance. The fact that the interface 302 and the processing unit 301 are configured so as to be active at reduced performance is shown thanks to hatched squares in FIG. 8B. Said supplying device 110 is then in energy saving mode.

The second bridge device 112 also detects the low level bidirectional traffic between said supplying device 110 and said consuming device 113. The processing unit 321, the interface 320 and the interface 322 are then reconfigured so as to be active at reduced performance. This situation is shown in FIG. 8C. The fact that the interface 320, the interface 322 and the processing unit 321 are configured so as to be active at reduced performance is shown by hatched squares in FIG. 8C. The second bridge device 112 is then in energy saving mode.

The passage of the second bridge device 112 into energy saving mode is detected by the interface 332 of said consuming device 113. For example, as already indicated, in the context of the IEEE 802.3az standard, the passage into energy saving mode is signified by the regular sending of the LPI signal. The interface 332 is then reconfigured so as to be active at reduced performance, to allow possible subsequent reawakening of the interface 332 by the second bridge device 112. The processing unit 331 is also reconfigured so as to be active at reduced performance. Said consuming device 113 is then in energy saving mode. The data transmission system is then in hibernation state, as shown in FIG. 5D.

It should be noted that the second bridge device 112 may detect, before, or at the same time as, the first device 111, the small volume of data traffic between said supplying device 110 and said consuming device 113.

Figure 9A:
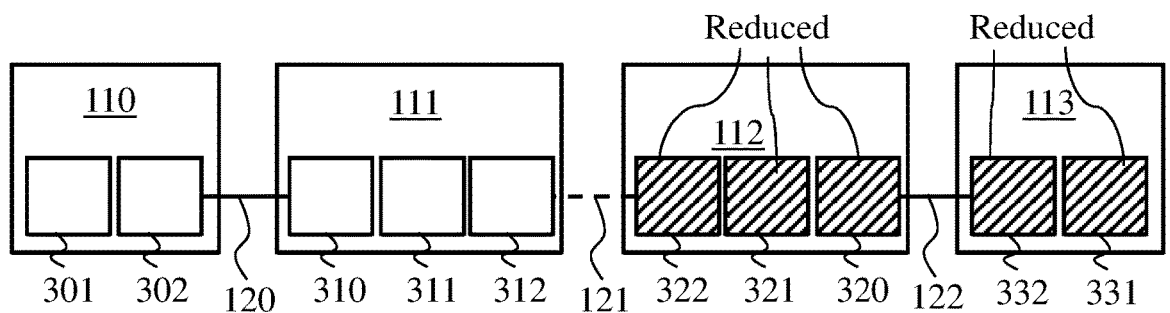
FIGS. 9A to 9B schematically illustrate a third scenario in which the data transmission system passes from a hibernation state to the nominal operating state.
Figure 9B:
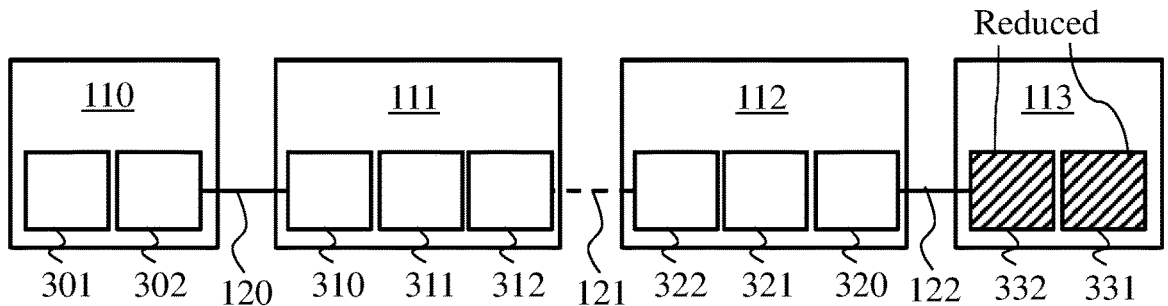

FIGS. 9A and 9B schematically illustrate a third scenario in which the data transmission system passes from a hibernation state to the nominal operating state.

As with the scenario described in relation to FIGS. 8A to 8C, the first bridge device 111 and the second bridge device 112 are adapted for analysing the volume of data traffic between said supplying device 110 and said consuming device 113. When the volume of traffic from said supplying device 110 to said consuming device 113 is less than or equal to the first threshold TH1 during a predefined time window and/or when the volume of traffic from said consuming device 113 to said supplying device 110 is less than or equal to the second threshold TH2 during said predefined time window, the first bridge device 111 and the second bridge device 112 trigger a reawakening (exit from hibernation) of the data transmission system.

The data transmission system is in the hibernation state, as shown in FIG. 5D. Let us consider that the first bridge device 111 detects a return to a high traffic level on at least one of the two directions between said supplying device 110 and said consuming device 113. This high level of traffic can come only from the interface 310 in our assumption, previously involving a reconfiguration of the processing unit 301 and of the interface 302 of the supplying device 110. Following the detection of traffic by the first bridge device 111, the interface 310, the processing unit 311 and the interface 312 are then reconfigured so as to be fully active. This situation is shown in FIG. 9A. The fact that the processing unit 301, the interface 302, the interface 310, the interface 312 and the processing unit 311 are reconfigured so as to be fully active is shown by white squares in FIG. 9A. The supplying device 110 and the first bridge device 111 are then in nominal operating mode.

The second bridge device 112 also detects the return to a high level of bidirectional traffic between said supplying device 110 and said consuming device 113. The interface 320 is then reconfigured so as to be fully active. The processing unit 321 and the interface 322 are also reconfigured so as to be fully active. This situation is shown in FIG. 9B. The fact that the interface 320, the interface 322 and the processing unit 321 are configured so as to be fully active is shown by white squares in FIG. 9B.

The return of the second bridge device 112 to nominal operating mode is detected by the interface 332 of said consuming device 113 via the second wired link 122, since the interface 332 of said consuming device 113 had remained listening for a return to activity of the second bridge device 112 via the second wired link 122. For example, as already indicated, in accordance with the Energy Detect+ mechanism, reconfiguration of the interface 322 so as to be fully active involves a link negotiation procedure starting with the sending of NLP signals. The interface 332 and the processing unit 331 of said consuming device 113 are then reconfigured so as to be fully active. Said consuming device 113 is then in nominal operating mode. The data transmission system is then once again in nominal operation, namely the configuration illustrated by FIG. 3A.

FIGS. 10A to 10D schematically illustrate a second scenario in which the data transmission system passes from the nominal operating state to a partial switched-off state.

Figure 10A:
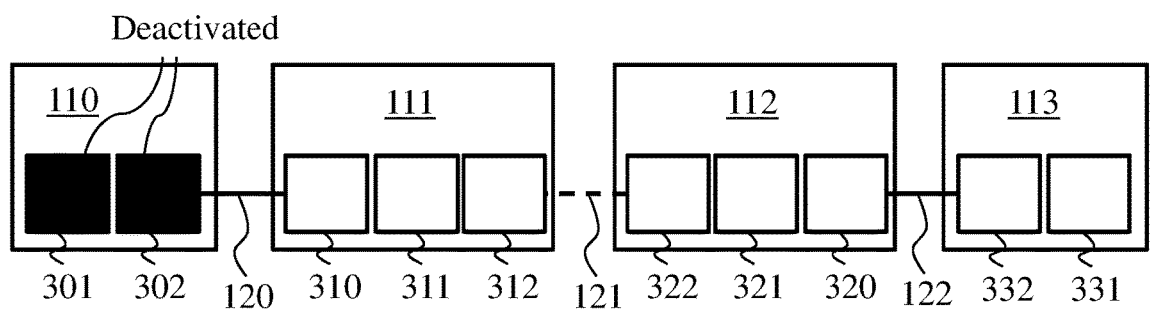
FIGS. 10A to 10D schematically illustrate a second scenario in which the data transmission system passes from a nominal operating state to a partial switched-off state.
Figure 10B:
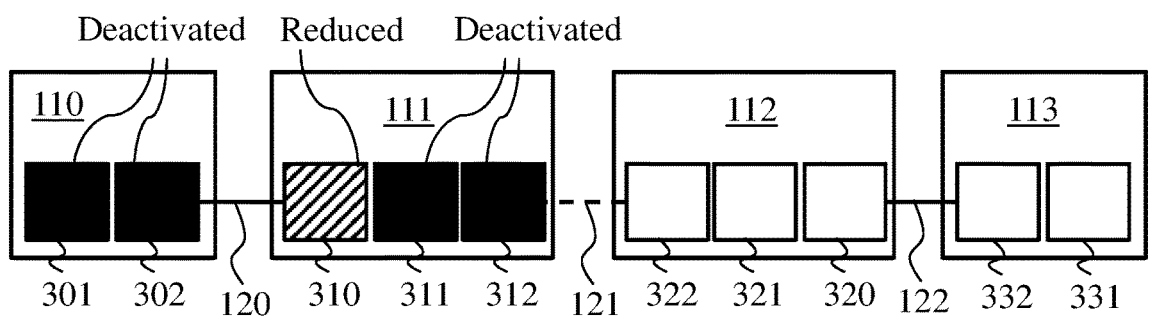
Figure 10C:
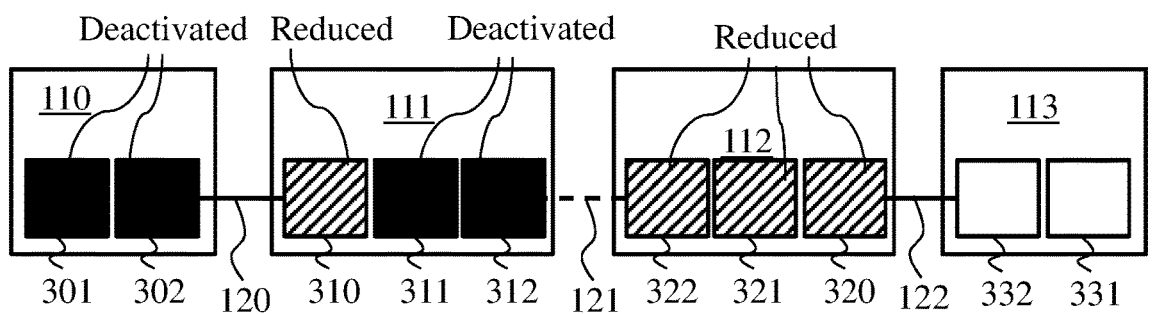

FIG. 10A schematically illustrates the data transmission system in an operating state in which said supplying device 110 has received a stop command while the data transmission system was in a nominal operating state as illustrated in FIG. 3A. Such a command is for example received following a user action on a dedicated button of said supplying device 110 or of a remote control associated with said supplying device 110. As a result said supplying device 110 passes into stop mode, by deactivating the interface 302, as well as the processing unit 331. The first wired link 120 then becomes inactive. The fact that the interface 302 and the processing unit 301 are deactivated is shown thanks to black squares in FIG. 10A.

The passage of said supplying device 110 into stop mode is detected by the interface 320 of the second bridge device 112, since the first wired link 120 has become inactive. The interface 310 is then reconfigured so as to be active at reduced performance, after optionally expiry of a time delay of predefined duration. This reconfiguration of the interface 310 allows energy saving, while keeping the ability to detect a return to activity of said supplying device 110 by reactivation of the first wired link 120, as for example described in the Energy Detect and Energy Detect+ mechanisms or in accordance with the IEEE 802.3az standard. The result is a deactivation of the interface 312 and deactivation of the processing unit 311. Reactivation of the processing unit 311 may subsequently be done thanks to a wake-up signal coming from the interface 310. The first bridge device 111 then disconnects the wireless communication network 121. The fact that the interface 312 and the processing unit 311 are deactivated is shown thanks to black squares in FIG. 10B and the fact that the interface 310 is active at reduced performance is shown by mean of a hatched square in FIG. 1 OB. Thus the first bridge device 111 is in stop mode.

Disconnection of the wireless communication network 121 is detected by the interface 322 of the second bridge device 112. The interface 322 is then reconfigured so as to be active at reduced performance, to allow detecting subsequent reconnection of the wireless communication network 121. The result is a reconfiguration of the interface 320 of the second bridge device 112 and a reconfiguration of the processing unit 321 so as to be active at reduced performance. The fact that the interface 320, the interface 322 and the processing unit 321 are configured so as to be active at reduced performance is shown thanks to hatched squares in FIG. 10C. Thus the second bridge device 112 is in energy saving mode.

The passage of the second bridge device 112 into energy saving mode is detected by the interface 332 of said consuming device 113. The interface 332 is then reconfigured so as to be active at reduced performance, to enable detecting a return to activity of the second bridge device 112 via the second wired link 122. The second wired link 122 therefore remains active. The result is a reconfiguration of the processing unit 331 so as to be active at reduced performance. The fact that the interface 332 and the processing unit 331 are reconfigured so as to be active at reduced performance is shown thanks to hatched squares in FIG. 10D. Thus said consuming device 113 is in energy saving mode. The data transmission system is then in a partial switched-off state. The data transmission system is then reconfigured in an optimised manner in terms of energy consumption and is able to awake up when said supplying device 110 returns to activity.

Figure 11A:
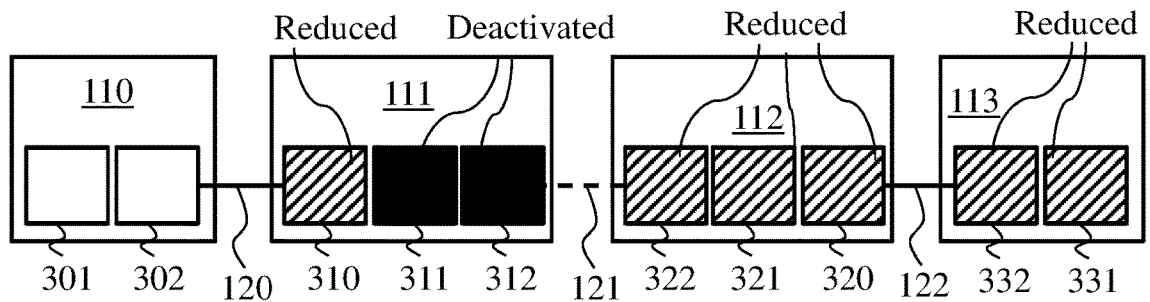
FIGS. 11A to 11C schematically illustrate a second scenario in which the data transmission system passes from a partial switched-off state to the nominal operating state.
Figure 11B:
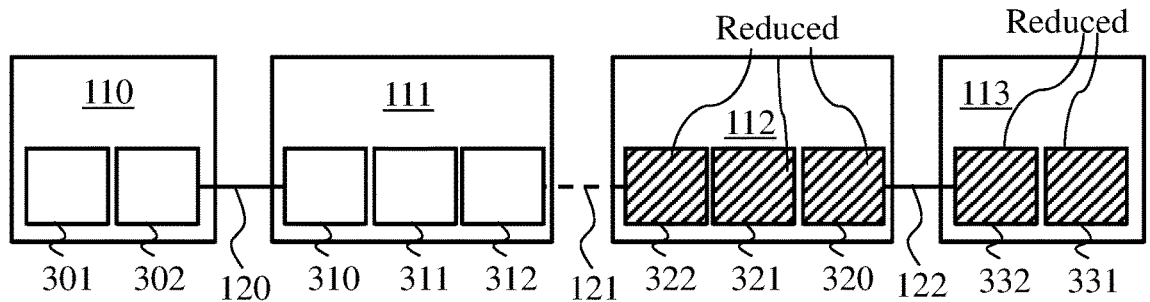
Figure 11C:
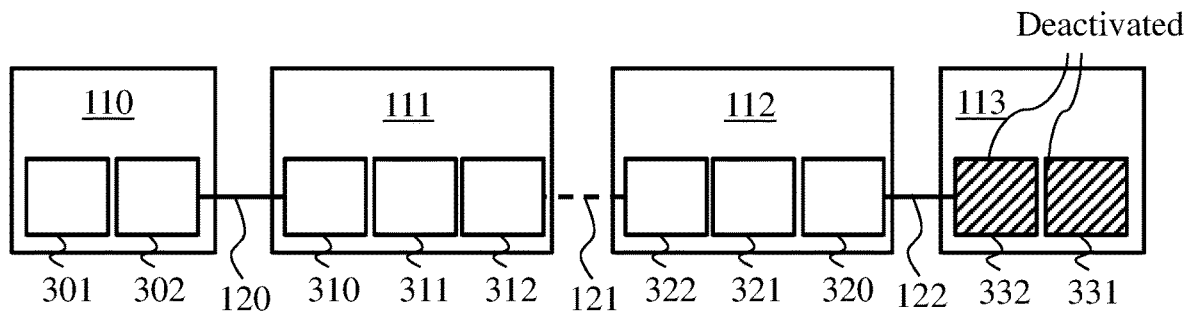

FIGS. 11A to 11C schematically illustrate a second scenario in which the data transmission system passes from a partial switched-off state to the nominal operating state.

Figure 10D:
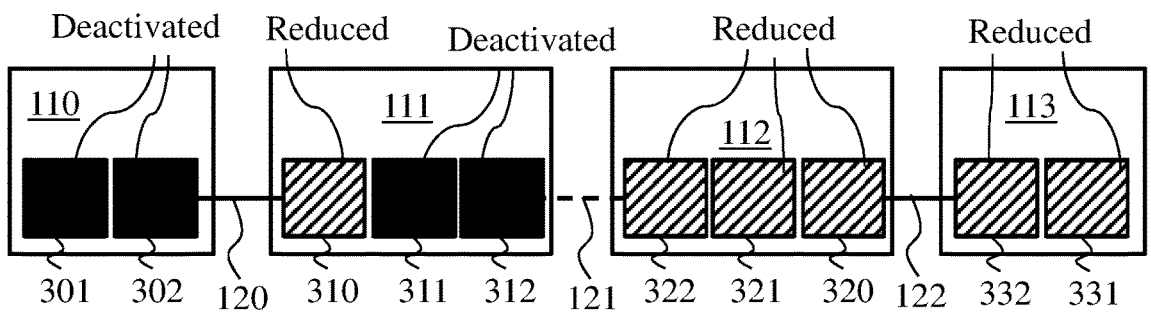

The data transmission system is in the partial switched-off state shown in FIG. 10D, when said supplying device 110 receives a switch-on command. Such a command is for example received following a user action on a dedicated button of said supplying device 110 or of a remote control associated with said supplying device 110. The result is a reconfiguration of the interface 302 and of the processing unit 301 so as to be fully active. This situation is shown in FIG. 11A. The fact that the interface 302 and the processing unit 301 are configured so as to be fully active is shown by white squares in FIG. 11A. Thus said supplying device 110 is in nominal operating mode.

The passage of said supplying device 110 into nominal operating mode is detected by the interface 310 of the first bridge device 111 via the first wired link 120, since the interface 310 had remained listening for reactivation of the first wired link 120 by the interface 302. For example, reconfiguration of the interface 302 so as to be fully active involves a link negotiation procedure starting with the sending of NLP signals. This activity is for example detected by the interface 310 in accordance with the Energy Detect or Energy Detect+ mechanisms or in accordance with the IEEE 802.3az standard. The interface 310 is then reconfigured so as to be fully active and the interface 310 wakes up the processing unit 311 so that the processing unit 311 is reconfigured so as to be fully active. The interface 312 is then reconfigured so as to be fully active and the first bridge device 111 reconnects the wireless communication network 121. This situation is shown in FIG. 11B. The fact that the interface 310, the interface 312 and the processing unit 311 are configured so as to be fully active is shown by white squares in FIG. 11B. The first bridge device 111 is then in nominal operating mode.

The reconnection of the wireless communication network 121 is detected by the interface 322 of the second bridge device 112, since the interface 322 had remained listening for a reconnection of the wireless communication network 121. The interface 322 is then reconfigured so as to be fully active. As a result the processing unit 321 and the interface 320 are also reconfigured so as to be fully active, which causes reactivation of the second wired link 122. This situation is shown in FIG. 11C. The fact that the interface 320, the interface 322 and the processing unit 321 are configured so as to be fully active is shown by white squares in FIG. 11C. The second bridge device 112 is then in nominal operating mode.

The passage of the second bridge device 112 into nominal operating mode is detected by the interface 332 of the consuming device 113 via the second wired link 122, since the interface 332 of said consuming device 113 had remained listening for a return of activity of the second bridge device 112 via the second wired link 122. For example, as already indicated, in accordance with the Energy Detect+ mechanism, reconfiguration of the interface 320 so as to be fully active involves a link negotiation procedure starting with the sending of NLP signals. The interface 332 and the processing unit 331 are then reconfigured so as to be fully active. Thus said consuming device 113 is in nominal operating mode. The data transmission system is then in the nominal operating state, namely in the configuration illustrated by FIG. 3A.

Figure 12:
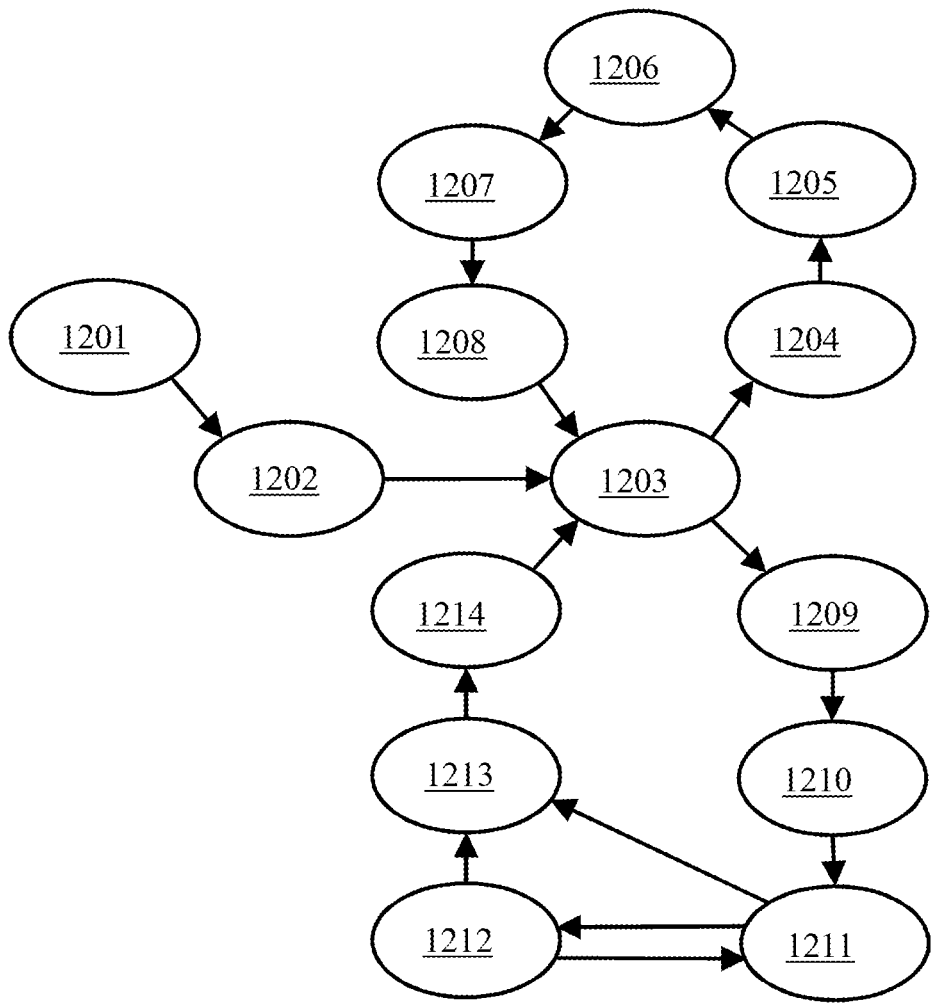
FIG. 12 schematically illustrates a state machine used by the second bridge device for implementing the above scenarios.

FIG. 12 schematically illustrate a state machine implemented by the second bridge device 112 for executing the above scenarios.

The state machine in FIG. 12 begins in a state 1201 in which the second bridge device 112 is initialised. Pairing the first bridge device 111 and the second bridge device 112 may be implemented when the second bridge device 112 is initialised. Once the initialisation has ended and when the wireless communication network 121 is of the Wi-Fi type, the second bridge device 112 goes into a state 1202 in which the second bridge device 112 determines which Wi-Fi configuration is to be applied when the interface 322 is active at reduced performance, thanks to measurements of the signal level received (from the first bridge device 111) and listening tests. The second bridge device 112 next goes into a state 1203 in which the second bridge device 112 is in nominal operating mode. The second bridge device 112 then evaluates the volume of bidirectional traffic between said supplying device 110 and said consuming device 113.

When the second bridge device 112 detects deactivation of the second wired link 122 and the second bridge device 112 is in the state 1203, the second bridge device 112 goes into a state 1204. When the second bridge device 112 detects that the consuming device 113 is put in energy saving mode or that there is a low level of bidirectional traffic between said supplying device 110 and said consuming device 113, the second bridge device 112 goes into a state 1209.

In the state 1204, the second bridge device 112 deactivates the interface 322 (which allows connecting the second bridge device 112 to the wireless communication network 121). Next, the second bridge device 112 goes into a state 1205 in which it deactivates, if possible, the processing unit 321. Next, the second bridge device 112 goes into a state 1206 in which the interface 320 (which allows connecting the second bridge device 112 to said consuming device 113) is configured so as to be active at reduced performance. The second bridge device 112 is then in stop mode.

When the second bridge device 112 detects reactivation of the second wired link 122 and the second bridge device 112 is in the state 1206, the second bridge device 112 goes into a state 1207 in which the interface 320 and the processing unit 321 are configured so as to be fully active. The second bridge device 112 then goes into a state 1208 in which the second bridge device 112 reconfigures the interface 322 so as to be fully active. Then the second bridge device 112 returns to the state 1203, meaning that the second bridge device 112 returns to nominal operating mode.

In the state 1209, the second bridge device 112 configures the interface 322 (which allows connecting the second bridge device 112 to the wireless communication network 121) so as to be active at reduced performance. Next, the second bridge device 112 goes into a state 1210 in which the second bridge device 112 configures, if possible, the processing unit 321 so as to be active at reduced performance. Next, the second bridge device 112 goes into a state 1211 in which the interface 320 is configured so as to be active at reduced performance. The second bridge device 112 is then in energy saving mode.

When the second bridge device 112 receives data coming from the second wired link 122 or coming from the wireless communication network 121 and the second bridge device 112 is in the state 1211, the second bridge device 112 passes into a state 1212 in which the second bridge device 112 evaluates the volume of bidirectional traffic between said supplying device 110 and said consuming device 113. When the volume of traffic from said supplying device 110 to said consuming device 113 is less than or equal to the first threshold TH1 and the volume of traffic from said consuming device 113 to said supplying device 110 is less than or equal to the second threshold TH2, the second bridge device 112 goes into the state 1211 again; otherwise the second bridge device 112 goes into a state 1213. A particular case exists when the second bridge device 112 has received, coming from the wireless communication network 121, a request for putting said consuming device 113 in nominal operation. In this case, the second bridge device 112 goes into the state 1213, even if the volume of bidirectional traffic between said supplying device 110 and said consuming device 113 is low.

When the second bridge device 112 detects that said consuming device 113 has gone into nominal operating mode again and the second bridge device 112 is in the state 1211, the second bridge device 112 goes into the state 1213.

In the state 1213, the second bridge device 112 configures the processing unit 321 so as to be fully active. Then the second bridge device 112 goes into a state 1214 in which the second bridge device 112 reconfigures the interface 322 and the interface 320 so as to be fully active. Then the second bridge device 112 returns to the state 1203, meaning that the second bridge device 112 returns into nominal operating mode.

Figure 13:
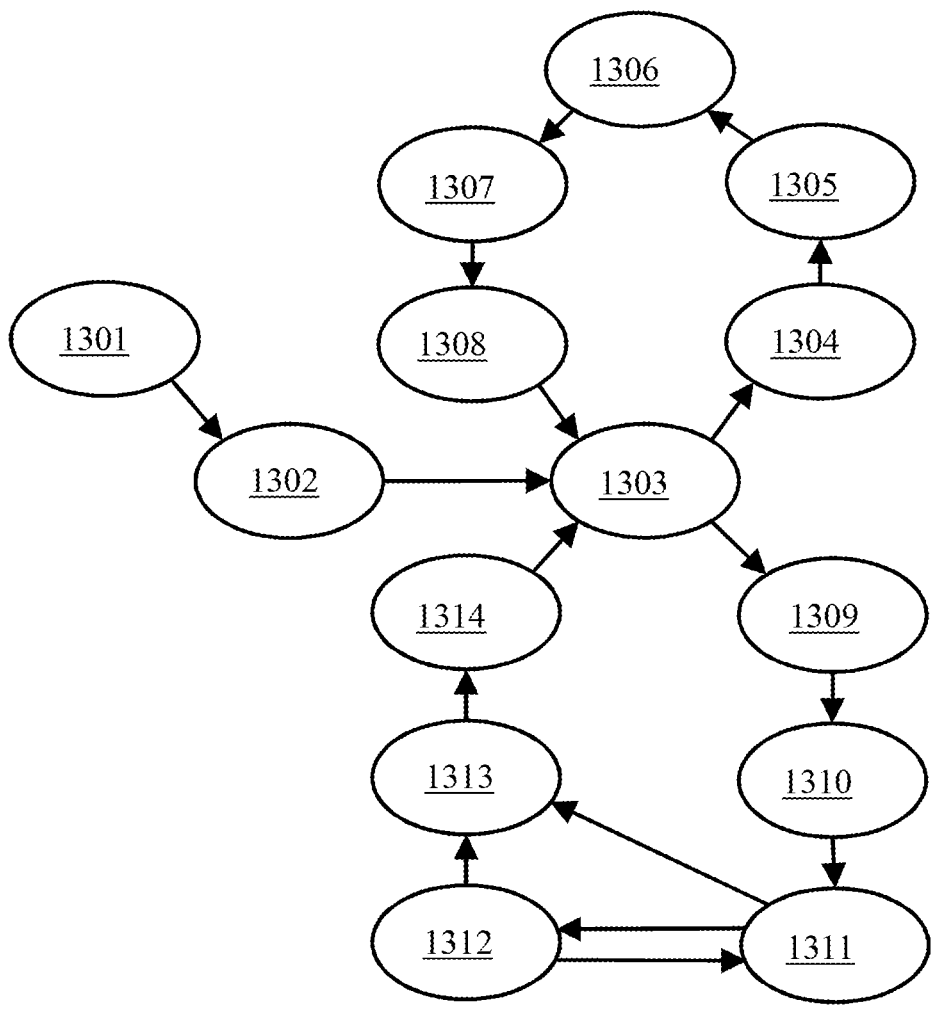
FIG. 13 schematically illustrates a state machine used by the first device for implementing the above scenarios.

FIG. 13 schematically illustrate a state machine implemented by the first bridge device 111 to execute the above scenarios.

The state machine in FIG. 13 in a state 1301 in which the first bridge device 111 is initialised. Pairing between the first bridge device 111 and the second bridge device 112 may be implemented when the first bridge device 111 is initialised. Once the initialisation is terminated and when the wireless communication network 121 is of the Wi-Fi type, the first bridge device 111 goes into a state 1302 in which the first bridge device 111 determines which Wi-Fi configuration is to be applied when the interface 312 is active at reduced performance, thanks to measurements of the signal level received (from the second bridge device 112) and listening tests. The first bridge device 111 then goes into a state 1303 in which the first bridge device 111 is in nominal operating mode. The first bridge device 111 then evaluates the volume of bidirectional traffic between said supplying device 110 and said consuming device 113.

When the first bridge device 111 detects deactivation of the first wired link 120 and the first bridge device 111 is in the state 1303, the first bridge device 111 goes into a state 1304. When the first bridge device 111 detects a low level of bidirectional traffic between said supplying device 110 and said consuming device 113 or detects that the second bridge device 112 is disconnected from the wireless communication network 121, the first bridge device 111 goes into a state 1309. In a particular embodiment, the first bridge device 111 goes into a state 1309, when the first bridge device 111 detects a lower level of bidirectional traffic between said supplying device 110 and said consuming device 113 or detects that no client device is connected to the wireless communication network 121, optionally since a predefined period of time.

In the state 1304, the first bridge device 111 deactivates the interface 312 (which allows connecting the wireless communication network 121). Next, the first bridge device 111 goes into a state 1305 in which the first bridge device 111 deactivates, if possible, the processing unit 311. Next, the first bridge device 111 goes into a state 1306 in which the interface 310 (which allows connecting the first bridge device 111 to said supplying device 110) is configured so as to be active at reduced performance. The first bridge device 111 is then in stop mode.

When the first bridge device 111 detects reactivation of the first wired link 120 and the first bridge device 111 is in the state 1306, the first bridge device 111 goes into a state 1307 in which the interface 310 and the processing unit 311 are configured so as to be fully active. The first bridge device 111 then goes into a state 1308 in which the first bridge device 111 reconfigures the interface 312 so as to be fully active. Then the first bridge device 111 returns to the state 1303, meaning that the first bridge device 111 returns to nominal operating mode.

In the state 1309, the first bridge device 111 configures the interface 312 (which allows connecting the wireless communication network 121) so as to be active at reduced performance. Next, the first bridge device 111 goes into a state 1310 in which the first bridge device 111 configures, if possible, the processing unit 311 so as to be active at reduced performance. Next, the first bridge device 111 goes into a state 1311 in which the interface 310 is configured so as to be active at reduced performance. The first bridge device 111 is then in energy saving mode.

When the first bridge device 111 receives data coming from the first wired link 120 or from the wireless communication network 121 and the first bridge device 111 is in the state 1311, the first bridge device 111 goes into a state 1312 in which the first bridge device 111 evaluates the volume of bidirectional traffic between said supplying device 110 and said consuming device 113. When the volume of traffic from said supplying device 110 to said consuming device 113 is less than or equal to the first threshold TH1 and the volume of traffic from said consuming device 113 to said supplying device 110 is less than or equal to the second threshold TH2, the first bridge device 111 goes into the state 1311 again; otherwise the first bridge device 111 goes into a state 1313. A particular case exists when the first bridge device 111 has 30 received, coming from the first wired link 120, a request for putting said consuming device 113 in nominal operation. In this case, the first bridge device 111 goes into the state 1313, even if the volume of bidirectional traffic between said supplying device 110 and said consuming device 113 is low.

When the first bridge device 111 detects that the second bridge device 112 has reconnected to the wireless communication network 121 and the first bridge device 111 is in the state 1311, the first bridge device 111 goes into the state 1313. In a particular embodiment, the first bridge device 111 goes into the state 1313 when at least one client device reconnects to the wireless communication network 121.

In the state 1313, the first bridge device 111 configures the processing unit 311 so as to be fully active. Then the first bridge device 111 goes into a state 1314 in which the first bridge device 111 reconfigures the interface 312 and the interface 311 so as to be fully active. Then the first bridge device 111 returns to the state 1203, meaning that the first bridge device 111 returns to nominal operating mode.

The invention claimed is:

1. A data transmission system comprising
a first bridge device and a second bridge device configured to be interconnected via a wireless communication network, the first bridge device being configured for connecting a data-supplying device via a first wired link, the second bridge device being configured for connecting a data-consuming device via a second wired link, wherein each of the first and second bridge devices is able to be configured in one of the following modes:
a nominal operating mode;
an energy saving mode in which, at least, interfaces with each one of said first wired link and said second wired link and with the wireless communication network are activated at reduced performance; and
a stop mode in which, at least, the interface with the wireless communication network is deactivated, and in which the interface with the respective one said first wired link and said second wired link is activated at reduced performance; and
wherein the first bridge device is configured for switching from the nominal operating mode to the stop mode following detection of deactivation of the first wired link,
the first bridge device is configured for switching from the nominal operating mode to the energy saving mode following detection that the second bridge device is disconnected from the wireless communication network or that the second bridge device has gone into the energy saving mode or following detection of bidirectional traffic volume between said supplying device and said consuming device that is less than or equal to a predefined threshold,
the second bridge device is configured for switching from the nominal operating mode to the stop mode following detection of deactivation of the second wired link, and
the second bridge device is configured for switching from the nominal operating mode to the energy saving mode following detection that said consuming device has been put in hibernation or detection of disconnection of the wireless communication network or detection of bidirectional traffic volume between said supplying device and said consuming device that is less than or equal to a predefined threshold.

2. The data transmission system according to claim 1, wherein the first bridge device is configured for switching from the stop mode to the nominal operating mode following detection of reactivation of the first wired link,
the first bridge device is configured for switching from the energy saving mode to the nominal operating mode following reception via the first wired link of a request for putting said consuming device in nominal operating mode or following detection of a volume of traffic between said supplying device and said consuming device that is greater than or equal to a predefined threshold, or following reconnection of the second bridge device to the wireless communication network,
the second bridge device is configured for switching from the stop mode to the nominal operating mode following detection of reactivation of the second wired link, and
the second bridge device is adapted for switching from the energy saving mode to the nominal operating mode following reception via the wireless communication network of a request for putting said consuming device in nominal operation or following reception via the second wired link of a message indicating that said consuming device has come out of hibernation or following detection of a volume of traffic between said supplying device and said consuming device that is greater than or equal to a predefined threshold.

3. The data transmission system according to claim 2, wherein the request for putting said consuming device in nominal operation is a magic packet intended for said consuming device according to a Wake on LAN protocol.

4. The data transmission system according to claim 1, wherein the second bridge device detects that said consuming device is put in hibernation:
by regularly sending a probe message to said consuming device in order to test whether said consuming device is put in hibernation; or
by analysing exchanges between said supplying device and said consuming device according to an UPnP Low Power standards; or
by receiving from said consuming device a message indicating that said consuming device is put in hibernation.

5. The data transmission system according to claim 1, wherein the volume of bidirectional traffic between said supplying device and said consuming device is detected by comparing a filling of the queues of the respective first and second bridge devices concerned with predefined respective thresholds.

6. The data transmission system according to claim 1, wherein the first and second wired links are of the Ethernet type and the wireless communication network is of the Wi-Fi type.

7. The data transmission system according to claim 1, wherein the system comprises said supplying device and said consuming device, said supplying device is a residential gateway adapted for transmitting audiovisual data to said consuming device, and said consuming device is a decoding device adapted for decoding the audiovisual data received from the supplying device.

8. The data transmission system according to claim 1, wherein the first bridge device and the second bridge device are configured to communicate in a Multiple Input Multiple Output (MIMO) mode and a Single Input Single Output (SISO) mode via the wireless communication network.

9. The data transmission system according to claim 8, wherein the first and second bridge devices are configured to communicate in the MIMO mode when the first and second bridge devices are in the nominal operating mode and the first and second bridge devices are configured to communicate in the SISO mode when the first and second bridge devices are in the energy saving mode.

10. The data transmission system according to claim 1, wherein the first bridge device is configured to directly connect to the data-supplying device via the first wired link, and the second bridge device is configured to directly connect to the data-consuming device via the second wired link.

11. The data transmission system according to claim 1, wherein the first bridge device and the second bridge device are configured to communicate in a Multiple Input Multiple Output (MIMO) mode and a Single Input Single Output (SISO) mode via the wireless communication network,
the first and second bridge devices are configured to communicate in the MIMO mode when the first and second bridge devices are in the nominal operating mode and the first and second bridge devices are configured to communicate in the SISO mode when the first and second bridge devices are in the energy saving mode,
the first bridge device is configured for switching from the stop mode to the nominal operating mode following detection of reactivation of the first wired link, the first bridge device is configured for switching from the energy saving mode to the nominal operating mode following reception via the first wired link of a request for putting said consuming device in nominal operating mode or following detection of a volume of traffic between said supplying device and said consuming device that is greater than or equal to a predefined threshold, or following reconnection of the second bridge device to the wireless communication network, the second bridge device is configured for switching from the stop mode to the nominal operating mode following detection of reactivation of the second wired link, and the second bridge device is adapted for switching from the energy saving mode to the nominal operating mode following reception via the wireless communication network of a request for putting said consuming device in nominal operation or following reception via the second wired link of a message indicating that said consuming device has come out of hibernation or following detection of a volume of traffic between said supplying device and said consuming device that is greater than or equal to a predefined threshold.

12. A method implemented by a data transmission system comprising a first bridge device and a second bridge device interconnected via a wireless communication network, the first bridge device being connected to a data-supplying device by a first wired link, the second bridge device being connected to a data-consuming device via a second wired link, wherein each one of the first and second bridge devices is able to be configured in one of the following modes:
   a nominal operating mode;
   an energy saving mode in which at least interfaces with each one of said first wired link and said second wired link and with the wireless communication network are active at reduced performance; and
   a stop mode in which, at least, the interface with the wireless communication network is deactivated, and in which the interface with the respective one said first wired link and said second wired link is active at reduced performance; and
   wherein the first bridge device switches from the nominal operating mode to the stop mode following detection of deactivation of the first wired link;
   the first bridge device switches from the nominal operating mode to the energy saving mode following detection that the second bridge device is disconnected from the wireless communication network or that the second bridge device has gone into the energy saving mode or following detection of a bidirectional traffic volume between said supplying device and said consuming device that is less than or equal to a predefined threshold;
   the second bridge device switches from the nominal operating mode to the stop mode following detection of deactivation of the second wired link, and
   wherein the second bridge device switches from the nominal operating mode to the energy saving mode following detection that said consuming device has been put in hibernation or following detection of disconnection of the wireless communication network or detection of a bidirectional traffic volume between said supplying device and said consuming device that is less than or equal to a predefined threshold.

13. A first bridge device, configured for use in a data transmission system including a second bridge device configured to be connected to a data-consuming device, the first bridge device comprising:
   a wireless communication interface configured to be interconnected via a wireless communication network to the second bridge device, and
   a wired link configured for connecting the first bridge to a data-supplying device, wherein the first bridge device is able to be configured in one of the following modes:
     a nominal operating mode;
     an energy saving mode in which, at least, said wired link and the wireless communication interface are active at reduced performance; and
     a stop mode in which, at least, the wireless communication interface is deactivated, and in which said wired link is active at reduced performance; and
   wherein the first bridge device is configured for switching from the nominal operating mode to the stop mode following detection of deactivation of the wired link; and
   the first bridge device is configured for switching from the nominal operating mode to the energy saving mode following detection that the second bridge device is disconnected from the wireless communication network or that the second bridge device has gone into the energy saving mode or following detection of a bidirectional traffic volume between said supplying device and said consuming device that is less than or equal to a predefined threshold.

14. A second bridge device, configured for use in a data transmission system including a first bridge device configured to be connected to a data-supplying device, the second bridge comprising:
   a wireless communication interface configured to be interconnected via a wireless communication network to the first bridge device,
   a wired link configured for connecting the second bridge device to a data-consuming device, wherein the second bridge device is able to be configured in one of the following modes:
     a nominal operating mode;
     an energy saving mode in which, at least, said wired link and the wireless communication interface are active; and
     a stop mode in which, at least, the wireless communication interface is deactivated, and in which said wired link is active at reduced performance; and
   wherein the second bridge device is configured for switching from the nominal operating mode to the stop mode following detection of deactivation of the wired link; and
   the second bridge device is configured for switching from the nominal operating mode to the energy saving mode following detection that said consuming device has been put in hibernation or following detection of disconnection of the wireless communication network or following detection of a bidirectional traffic volume between said supplying device and said consuming device that is less than or equal to a predefined threshold.

15. A method implemented by a first bridge device of a data transmission system including a second bridge device, the first and second bridge devices being interconnected via a wireless communication network, the first bridge device being connected to a data-supplying device via a wired link, the second bridge device being connected to a data-consuming device, wherein the first bridge device is able to be configured in one of the following modes:

a nominal operating mode;

an energy saving mode in which, at least, an interface with said wired link and an interface with the communication network are active; and a stop mode in which, at least, the interface with the communication network is deactivated, and in which the interface with said wired link is active at reduced performance; the method comprising:

switching the first bridge device from the nominal operating mode to the stop mode following detection of deactivation of the wired link; and switching the first bridge from the nominal operating mode to the energy saving mode following detection that the second bridge device is disconnected from the wireless communication network or that the second bridge device has gone into the energy saving mode or following detection of a bidirectional traffic volume between said supplying device and said consuming device that is less than or equal to a predefined threshold.

16. A non transitory storage medium that stores a computer program comprising instructions for implementing the method according to claim 15, when said program is executed by a processor of said first bridge device.

17. A method implemented by a second bridge device in a data transmission system including a first bridge device, the first and second bridge devices being interconnected by a wireless communication network, the first bridge device being connected to a data-supplying device, the second bridge device being connected to a data-consuming device via a wired link, wherein the second bridge device is able to be configured in one of the following modes:

a nominal operating mode;

an energy saving mode in which, at least, an interface with said wired link and an interface with the communication network are active at reduced performance; and a stop mode in which, at least, the interface with the communication network is deactivated, and in which the interface with said wired link is at reduced performance; the method comprising:

switching the second bridge device from the nominal operating mode to the stop mode following detection of deactivation of the wired link, and switching the second bridge device from the nominal operating mode to the energy saving mode following detection that said consuming device has been put in hibernation or following detection of disconnection of the wireless communication network or following detection of a bidirectional traffic volume between said supplying device and said consuming device that is less than or equal to a predefined threshold.

* * * * *